United States Patent
Muehl et al.

(10) Patent No.: US 12,499,761 B2
(45) Date of Patent: Dec. 16, 2025

(54) STITCHING SENSOR DATA FROM VEHICLES LINKED TO SPATIAL, TEMPORAL OR OPERATOR CRITERIA

(71) Applicant: Rivian IP Holdings, LLC, Irvine, CA (US)

(72) Inventors: Sebastian Muehl, Mountain View, CA (US); Jacob Melchert, Cleveland, OH (US); Danielle Jang, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 600 days.

(21) Appl. No.: 17/852,675

(22) Filed: Jun. 29, 2022

(65) Prior Publication Data

US 2024/0005792 A1    Jan. 4, 2024

(51) Int. Cl.
*G08G 1/0967*    (2006.01)
*G07C 5/08*    (2006.01)
*G08G 1/01*    (2006.01)

(52) U.S. Cl.
CPC ..... *G08G 1/096791* (2013.01); *G07C 5/0841* (2013.01); *G08G 1/0112* (2013.01)

(58) Field of Classification Search
CPC .... G06V 20/52; G08G 1/096716; G08G 1/20; G08G 1/205; G08G 1/096791; G08G 1/0112; G07C 5/0841
See application file for complete search history.

(56) References Cited

U.S. PATENT DOCUMENTS

| | | | |
|---|---|---|---|
| 9,598,050 B2* | 3/2017 | Cogill | B60R 25/31 |
| 9,871,692 B1* | 1/2018 | Hutz | H04W 4/02 |
| 10,029,648 B2* | 7/2018 | Hwang | G08B 13/19647 |
| 10,471,934 B2* | 11/2019 | Ignaczak | H04W 4/023 |
| 10,699,376 B1* | 6/2020 | Kwok | B60R 1/28 |
| 10,752,213 B2* | 8/2020 | Price | B60R 25/305 |
| 11,034,299 B2* | 6/2021 | Peterson | G06V 20/635 |
| 11,146,759 B1* | 10/2021 | Brune | H04R 1/08 |
| 11,341,614 B1* | 5/2022 | Chen | G06T 7/73 |
| 11,457,184 B2* | 9/2022 | Nakabayashi | G01C 21/206 |
| 11,616,932 B1* | 3/2023 | Xu | H04W 4/38 348/207.99 |
| 11,865,978 B2* | 1/2024 | Heafitz | H04N 13/296 |
| 11,945,404 B2* | 4/2024 | Pham | B60R 25/31 |
| 2007/0133356 A1* | 6/2007 | O'Connor | G08B 25/016 368/243 |
| 2013/0342333 A1* | 12/2013 | Hutchings | G08B 13/19647 348/148 |

(Continued)

*Primary Examiner* — Aryan E Weisenfeld
(74) *Attorney, Agent, or Firm* — Foley & Lardner LLP

(57) ABSTRACT

A system can identify, from a first sensor of a first vehicle in response to an activation by the first vehicle of a mode that initiates transmission from the first sensor, first data of movement of an object and a timestamp, identify, based on the timestamp and from a second sensor of a second vehicle in response to an activation by the first vehicle of the mode, second data of the movement of the object, link, in response to a determination that a location of the first vehicle and a location of the second vehicle each satisfy a location threshold, the first data with the second data to indicate the movement of the object relative to the location of the first vehicle and the location of the second vehicle, and provide a presentation of the movement.

20 Claims, 15 Drawing Sheets

(56) References Cited

U.S. PATENT DOCUMENTS

| | | | |
|---|---|---|---|
| 2017/0080898 A1* | 3/2017 | Cogill | B60R 25/30 |
| 2020/0216022 A1* | 7/2020 | Cheng | H04W 4/40 |
| 2020/0216026 A1* | 7/2020 | Price | G08B 13/19647 |
| 2020/0247359 A1* | 8/2020 | Murray | G06N 20/00 |
| 2020/0285250 A1* | 9/2020 | Castorena Martinez | G08G 1/165 |
| 2021/0086793 A1* | 3/2021 | Stefan | G06V 10/82 |
| 2021/0129793 A1* | 5/2021 | Murray | G08G 1/16 |
| 2021/0281804 A1* | 9/2021 | Nakabayashi | H04N 7/188 |
| 2021/0331648 A1* | 10/2021 | Pham | G01S 17/88 |
| 2022/0114879 A1* | 4/2022 | Larsen | B60Q 1/535 |
| 2022/0289143 A1* | 9/2022 | Salter | G08G 1/166 |
| 2024/0385282 A1* | 11/2024 | Stefanatos | G01S 13/931 |

* cited by examiner

STITCHING SENSOR DATA FROM VEHICLES LINKED TO SPATIAL, TEMPORAL OR OPERATOR CRITERIA

INTRODUCTION

Cameras can be fixed on physical infrastructure, such as buildings, to capture images or video. However, cameras affixed to physical infrastructure can have a limited field of view, thereby resulting in blind spots in collected data.

SUMMARY

Present implementations are directed to stitching sensor data from vehicles linked to spatial, temporal or operator criteria. For example, a system can obtain sensor data from one or more vehicles associated with a particular location. The location can include one or more coordinates, addresses, points, addresses, geofences, or jurisdictions, for example. The system can obtain sensor data from vehicle within a particular parking lot, yard, or any other physical property or area. The system can be remote from the one or more vehicles, the parking lot, or the yard, for example. The system can obtain sensor data upon from one or more vehicles based on a determination by the vehicle to transmit the sensor data. A vehicle can determine to transmit sensor data in response to stimulus detected at the sensor or an identification of particular aspects within the sensor data. Stimulus can include movement, and identification can include identification of a face or voice. The vehicle can restrict transmission of or access to sensor data by the system. The system can restrict collection of sensor data with respect to particular operator. For example, an operator can include a common owner or fleet operator assigned to one or more vehicles. The system may identify the fleet operator as authorized to access sensor data transmitted by particular vehicles linked to or associated with the operator.

The system can stitch together sensor data from one or more vehicles, once received, and can generate various graphical user interface (GUI) presentations based on the sensor data. The presentations can be indicative of various stimulus detected by the sensor, can identify particular sensors, can present various identifications based on the sensor data, and can present various actions by one or more vehicles in response to the sensor data. The system can stitch together sensor data from multiple vehicles based on the time associated with the sensor data. For example, the system can show video from one or more cameras where movement is indicated. Video from one or more vehicle sensors can be aligned based on timestamps associated with the various video sources, and can be presented concurrently at a user interface of the system. Thus, the system can stitch together sensor data from multiple co-located vehicles based on timestamp and filtered by operator or location, for example.

At least one aspect is directed to a system. The system can include a data processing system. The data processing system can include one or more processors, coupled to memory, to identify, from a first sensor of a first vehicle in response to an activation by the first vehicle of a mode that initiates transmission from the first sensor, first data indicative of movement of an object and a timestamp. The data processing system can identify, based on the timestamp and from a second sensor of a second vehicle in response to an activation by the first vehicle of the mode that initiates transmission from the second sensor, second data indicative of the movement of the object. The data processing system can link, in response to a determination that a location of the first vehicle and a location of the second vehicle each satisfy a location threshold, the first data with the second data to indicate, via a graphical user interface, the movement of the object relative to the location of the first vehicle and the location of the second vehicle. The data processing system can provide, for presentation via the graphical user interface, a presentation indicative of the movement of the object relative to the location of the first vehicle and the location of the second vehicle.

At least one aspect is directed to a vehicle. The vehicle can include a sensor, a non-transitory memory, and one or more processors to activate a mode that initiates transmission from the sensor. The vehicle can detect, by the sensor, movement of an object. The vehicle can transmit, in response to the activating, a timestamp and first data indicative of the movement of the object and a timestamp. The vehicle can receive an instruction based on the timestamp and an identification of the first data and an identification of second data indicative of the movement of the object and detected by a second sensor of a second vehicle activated by the second vehicle in a mode that initiates transmission from the second sensor, and generated in response a determination that a location of the vehicle and a location of the second vehicle each satisfy a location threshold. The vehicle can perform, in response to the determination that the location of the vehicle satisfies a location threshold corresponding to a location of a second vehicle, a first action.

At least one aspect is directed to a method. The method can include identifying, from a first sensor of a first vehicle in response to an activation by the first vehicle of a mode that initiates transmission from the first sensor, first data indicating movement of an object and a timestamp. The method can identify, based on the timestamp and from a second sensor of a second vehicle in response to an activation by the first vehicle of the mode that initiates transmission from the first sensor, second data indicating the movement of the object. The method can link, in response to a determination that a location of the first vehicle and a location of the second vehicle each satisfy a location threshold, the first data and the second data to indicate, via a graphical user interface, the movement of the object relative to the location of the first vehicle and the location of the second vehicle. The method can provide, for presentation via the graphical user interface, a presentation indicating the movement of the object relative to the location of the first vehicle and the location of the second vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
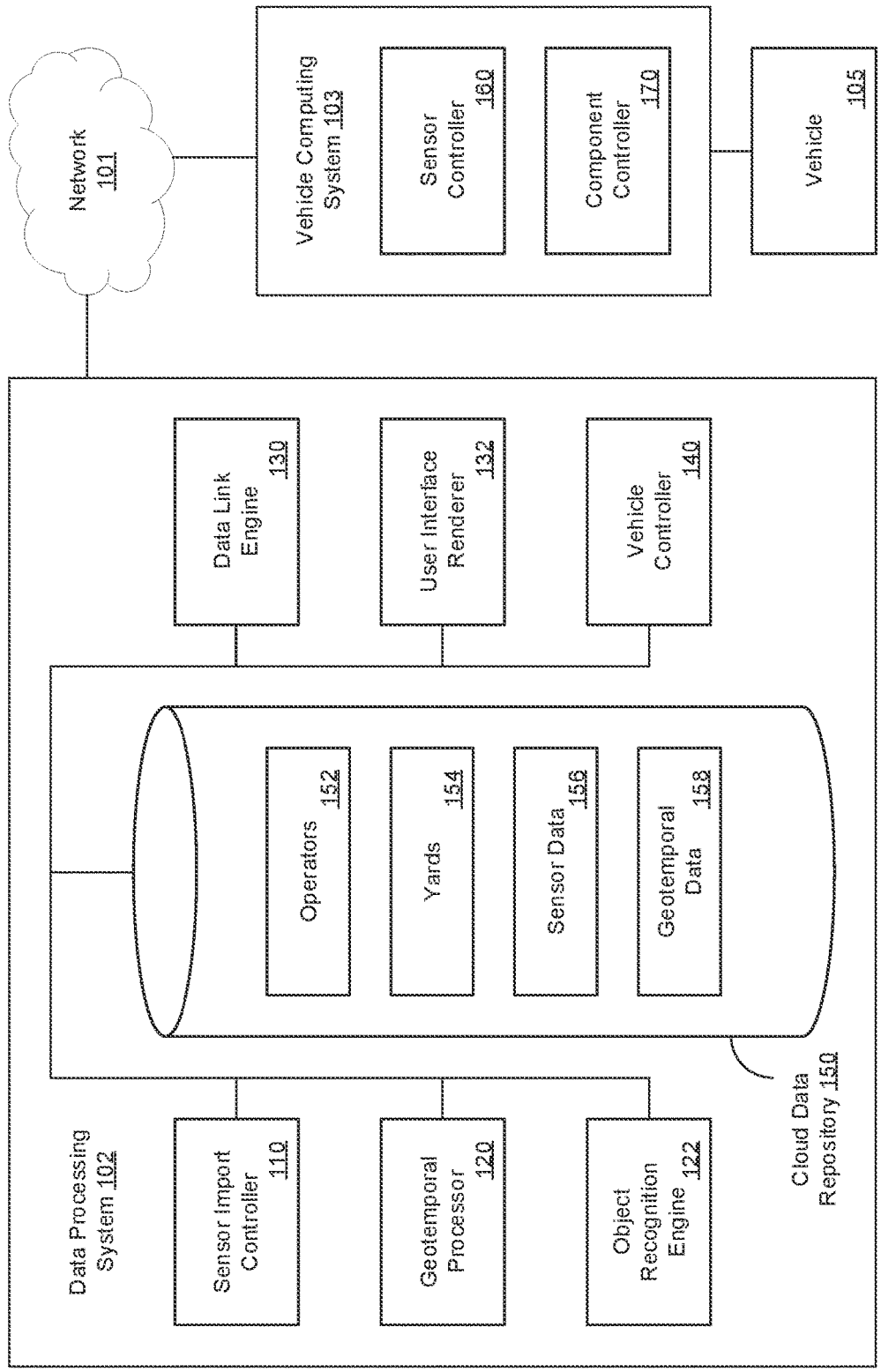
FIG. 1 depicts a system in accordance with present implementations.

Following below are more detailed descriptions of various concepts related to, and implementations of, methods, apparatuses, and systems of stitching sensor data from vehicles linked to spatial, temporal, or operator criteria. The various concepts introduced above and discussed in greater detail below may be implemented in any of numerous ways.

The present disclosure is directed to systems and methods of stitching sensor data from vehicles linked to spatial, temporal, or operator criteria. This technical solution is generally directed to improving coordinated monitoring of sensors of multiple vehicles within a particular location, and responding to events detected by the sensors. The technical solution can obtain sensor data from one or more vehicles within a particular location or geographic volume, and can identify presence or movement of an object through the location or volume based on aggregating the sensor data received from the vehicles. Movement can include a vector with a direction and a speed relative to a location. The location, area, or volume can correspond to a parking lot, parking garage, or field, for example. The technical solution can obtain sensor data based on one or more transmission criteria defined by the vehicle, and can instruct one or more vehicles to perform an action in response to the receipt of the sensor data. The sensor data can be obtained at a system remote from the location or volume of the vehicles. The system can include a user interface to present sensor data or representations of sensor data obtained from one or more of the vehicles in the location. The system can securely aggregate sensor data based on vehicles satisfying a particular controller, operator, manager, or any combination thereof. The system can, for example, be controlled by a particular operator entity, and can obtain sensor data only from vehicles controlled, owned, operated, or managed by the operator entity.

The system can obtain sensor data in accordance with one or more criteria defined by the vehicle or defined by the system. Each vehicle can maintain sensor data locally at the vehicle, and can restrict or prevent access by the system to the sensor data generated at the vehicle. The sensor data can include image or video data in visual spectra, invisible spectra. The sensor data can be obtained by sensors including but not limited to video cameras, motion capture cameras, infrared cameras, night vision cameras, radio detection and ranging (RADAR) sensors, light detection and ranging (LIDAR) sensors. Each vehicle can transmit sensor data to a system in response to a detection by a sensor of the vehicle that satisfies a sensor threshold. A sensor threshold can include detection of an object of a particular size, detection of an object movement at a particular speed or in a particular direction, detection of a face, or any combination thereof. Each vehicle can provide local control at the vehicle over conditions for transmission of sensor data to the system and conditions for remote access to the sensor data of the vehicle. Each vehicle can transmit timestamp data and location data in connection with the sensor data. Each vehicle can embed the timestamp data and the location data in the sensor data. Each vehicle can transmit the timestamp data or the location data separately from the sensor data.

The system can obtain sensor data, location data, and timestamp data from multiple vehicles, and can generate a user interface presentation indicating presence or movement of one or more objects within a location associated with the vehicles. The system can identify a particular object as a person, for example, and can further identify an individual person among a plurality of detected individuals. The system can reference identified objects or people within the location to particular timestamps based on the timestamps associated with the sensor data obtained from the particular vehicle. Based on the timestamp references and the locations associated with each vehicle, the system can generate a path of an object through the location of volume containing the vehicles. The path can be presented at a user interface of the system as a map or map-like image including the location or volume, the vehicles, and the persons or objects identified based on sensor data of the vehicles. The user interface can present the sensor data, including, for example, video captured by one or more of the vehicles including the object, and can include a control affordance to modify the user interface to present a location of the object or video of the object corresponding to a particular timestamp.

The system can combine sensor data from across multiple sensors and multiple vehicles providing sensor data. To combine the sensor data, the system can stitch together sensor data from various vehicles at various points in time into an object or file. The data can stitched together into a single object or file, or into multiple objects or files that can be played in succession, for example. The object or file can include sensor data that includes the object as its presence or movement changes from capture bye various sensor or sensors of the vehicle. The system can stitch together multiple concurrent sensor data sources that indicate presence or movement of the object. For example, the system can stitch together sensor data from two cameras into a concurrent presentation for a person that moves between two cars each having cameras facing the path of the person between the cars. The system can, for example, combine, associate, couple, stitch, or link the data from multiple sensors of multiple vehicles into a single object or presentation.

The system can instruct one or more vehicles to perform one or more individualized or coordinated actions is response to or based on the presence or movement of an object within the location or volume associated with the vehicle. Actions performed by the vehicle can include, for example, activating one or more components of the vehicles, including, for example, headlights, horns, door locks, doors, sensors, or alarms. The system can instruct the vehicles to perform one or more actions based on charge levels or power levels of the vehicle. For example, the system can instruct only vehicles a particular minimum battery charge level to perform an action. For example, the system can instruct a particular sensor of the vehicle that consumes power at a higher rate to activate (e.g., only) in response to a detection of an object or when a vehicle has a particular minimum battery charge level.

In some aspects, the system can include the data processing system to obtain, from the first vehicle in response to detection by the first sensor of the first vehicle of the movement of the object, the first data. The data processing system can obtain, from the second vehicle in response to detection by the second sensor of the second vehicle of the movement of the object, the second data. In some aspects, the system can include the data processing system to obtain, from the first vehicle or based on the first data, third data corresponding to the location of the first vehicle. The data processing system can obtain, from the second vehicle or based on the second data, fourth data corresponding to the location of the second vehicle. In some aspects, the system can include the data processing system to instruct, in response to the determination that the location of the first vehicle satisfies the location threshold, the first vehicle to perform a first action. In some aspects, the system can include the data processing system to instruct, in response to the determination that the location of the second vehicle satisfies the location threshold, the second vehicle to perform a second action corresponding to the first action.

In some aspects, the system can include the data processing system to generate, in response a determination that a power state of the first vehicle satisfies a power threshold, the presentation. In some aspects, the system can include the data processing system to generate, in response a determination a power state of the second vehicle satisfies the power threshold, the presentation. In some aspects, the system can include the data processing system to identify, in response a determination that the first vehicle and the second vehicle each correspond to a first operator, the first data and the second data.

In some aspects, the first action corresponds to a second action by the second vehicle. In some aspects, the vehicle can include the processors to cause, in response to the transmission, a user interface to present an indication of the movement of the object relative to the location of the vehicle and the location of the second vehicle. In some aspects, the vehicle can include the location of the vehicle corresponding to third data transmitted by the vehicle or based on the first data. In some aspects, the vehicle can include the location of the second vehicle corresponding to fourth data transmitted by the second vehicle or based on the second data. In some aspects, the vehicle can include the processors to transmit a power state of the first vehicle, the action performed based on a determination that the power state satisfies a power threshold.

In some aspects, the method can include obtaining, from the first vehicle in response to detecting by the first sensor of the first vehicle of the movement of the object, the first data. The method can obtain, from the second vehicle in response to detecting by the second sensor of the second vehicle of the movement of the object, the second data. In some aspects, the method can include obtaining, from the first vehicle or based on the first data, third data corresponding to the location of the first vehicle. The method can obtain, from the second vehicle or based on the second data, fourth data corresponding to the location of the second vehicle. In some aspects, the method can include instructing, in response to the determination that the location of the first vehicle and the location of the second vehicle each satisfy the location threshold, the first vehicle to perform a first action and the second vehicle to perform a second action corresponding to the first action. In some aspects, the method can include generating, in response a determination that a power state of the first vehicle and a power state of the second vehicle each satisfy a power threshold, the presentation. In some aspects, the method can include identifying, in response a determination that the first vehicle and the second vehicle each correspond to a first operator, the first data and the second data.

As illustrated by way of example in FIG. 1, a system 100 can include a network 101, a data processing system 102, a vehicle computing system 103, and a vehicle 105. The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network.

The data processing system 102 can include a sensor import controller 110 to obtain sensor data from the vehicle 105. The data processing system 102 can include a geotemporal processor 120 to identify one or more spatial or temporal metrics associated with obtained sensor data. The data processing system 102 can include an object recognition engine 122 to identify one or more objects in obtained sensor data. The data processing system 102 can include a data link engine 130 to stitch together obtained sensor data. The data processing system 102 can include a user interface renderer 132 to present one or more user interface objects including or based on the obtained sensor data. The data processing system 102 can include a vehicle controller 140 to provide one or more instructions to the vehicle 105. The data processing system 102 can include a cloud data repository 150 to store one or more types and collections of data associated with the vehicle 105.

The sensor import controller 110 can obtain sensor data from the vehicle 105. The sensor import controller 110 can include an interface, application programming interface ("API") or communication channel operatively coupled with the vehicle computing system 103. The sensor import controller 110 can obtain sensor data from the vehicle 105 and other vehicles operatively coupled with the data processing system 102 by the network 101. The sensor import controller 110 can filter sensor data based on one or more filter criteria. For example, filter criteria can include an operator criteria. The sensor import controller 110 can obtain an operator identifier associated with sensor data obtained from the vehicle 105 or the sensor data obtained from the vehicle 105. The sensor import controller 110 can determine to processor or block from processing sensor data based on a determination that an operator associated with the sensor data corresponds to an operator requesting the sensor data. Thus, the sensor import controller 110 can provide for processing only sensor data associated with a particular operator. The sensor import controller 110 can store sensor data at the cloud data repository 150.

The geotemporal processor 120 can identify one or more spatial or temporal metrics associated with obtained sensor data. The geotemporal processor 120 can obtain sensor data from the sensor import controller 110. The geotemporal processor 120 can extract or identify, for example, spatial data and temporal data associated with the obtained sensor data. Spatial data can include data corresponding to a physical location. Spatial data can include a geolocation, a geofence, a coordinate, an address, a jurisdiction, or any combination thereof, for example. Temporal data include a timestamp, a datestamp, or any combination thereof, for example. The sensor data can include one or more of each of spatial data and temporal data. For example, the geotemporal processor 120 can extract a particular latitude and longitude coordinate pair from the obtained sensor data, and can extract a plurality of timestamps corresponding to one or more particular portions of the obtained sensor data. For example, the sensor data can include video data, and each frame of the video data can include a timestamp. The geotemporal processor 120 can provide sensor data to the object recognition engine 122.

The object recognition engine 122 can identify one or more objects in obtained sensor data. The object recognition engine 122 can extract one or more features from video data, for example, to identify one or more characteristics of detected stimulus. For example, the vehicle 105 can provide video data from one or more of its camera sensors in response to detection of movement stimulus at those sensors. The object recognition engine 122 can then identify the portion of the video having movement, and attempt to identify the cause of the movement. For example, the object recognition engine 122 can perform an image processing process on one or more frames of the video to identify an object, person, face, or any combination thereof. The object recognition engine 122 can obtain sensor data from multiple sensors having corresponding spatial and temporal data, and can perform an image processing process on one or more frames of videos from one or more sensors concurrently to identify an object, person, face, or any combination thereof. The object recognition engine 122 can generate one or more annotated associated with sensor data as a result of an image processing process. The object recognition engine 122 can provide the sensor data and the annotations to the data link engine 130.

The data link engine 130 can stitch together obtained sensor data. The data link engine 130 can combine sensor data from one or more sensors, based on identification performed by the object recognition engine 122. For example, the data link engine 130 can receive sensor data and annotations, and can stitch together video corresponding to annotated sensor data associated with a first person into a first stitched video, and can stitch together video corresponding to annotated sensor data associated with a second person into a second stitched video. The data link engine 130 can obtain sensor data associated with particular timestamps and combine the sensor data for concurrent presentation of portions of sensor data having matching or corresponding timestamps.

The user interface renderer 132 can present one or more user interface objects including or based on the obtained sensor data. The user interface renderer 132 can present sensor data as received from the vehicle 105, and can superimpose, for example an annotation onto the sensor data. The user interface renderer 132 can obtain stitched sensor data from the data link engine 130. The user interface renderer 132 can generate and present, or instruct a user interface to present, one or more user interface objects based on the sensor data. The user interface objects can include visual representations of a detected stimulus or identification within a sensor data, for example. The user interface objects can include visual representations of activity at the geolocation or activity by the vehicle 105 in response to the detected stimulus or identification at the vehicle 105 or another vehicle within the geolocation corresponding to the vehicle 105.

The vehicle controller 140 can provide one or more instructions to the vehicle 105. The vehicle controller 140 can provide instructions by an interface, API, or communication channel operatively coupled with the vehicle computing system 103. The vehicle controller 140 can instruct the vehicle 105 or another vehicle within the geolocation corresponding to the vehicle 105 to perform an action with respect to a particular component of the vehicle. A component of the vehicle can correspond, for example, to door locks, interior lights, exterior lights, an alarm system, a horn, an engine start, a high-power sensor, or any combination thereof, for example. An action can correspond to any activation or deactivation of any component of the vehicle 105 or another vehicle within the geolocation corresponding to the vehicle 105. The vehicle controller 140 can restrict action to vehicles associated with or linked to a particular operator.

The cloud data repository 150 can store one or more types and collections of data associated with the vehicle 105. The cloud data repository 150 can include operator storage 152, yard storage 154, sensor data storage 156, and geotemporal data storage 158. The operator storage 152 can store identifications of various operators and associations of various operations with various vehicles. The yard storage 154 can store spatial data associated with particular locations where vehicles can be physically located or physically stored. The sensor data storage 156 can store sensor data obtained from one or more vehicles. The sensor data storage 156 can be partitioned or restricted based on operator associated with particular instances of sensor data. The geotemporal data storage 158 can store links between particular spatial data, particular temporal data, and particular sensor data. The geotemporal data storage 158 can include links between particular timestamps and particular portions of sensor data, for example. The geotemporal data storage 158 can include links between particular coordinates or geofences and particular portions of sensor data, for example.

The vehicle computing system 103 can communicate with the data processing system 102 by the network 101, and can communicate with the vehicle 105 by one or more communication protocols therebetween. The vehicle computing system 103 can include a sensor controller 160, and component controller 170. The sensor controller 160 can communicate with one or more sensor devices of the vehicle 105. The sensor controller 160 can be integrated with the vehicle 105, and can communicate bidirectionally with one or more sensor devices integrated with the vehicle 105 or operatively coupled with the vehicle 105. The sensor controller 160 can communicate with one or more sensor devices by a sensor communication channel integrated with the vehicle 105. The component controller 170 can communicate with one or more components of the vehicle 105. The component controller 170 can be integrated with the vehicle 105, and can communicate bidirectionally with one or more components integrated with the vehicle 105 or operatively coupled with the vehicle 105. The component controller 170 can communicate with one or more components by a component communication channel integrated with the vehicle 105. The sensor communication channel and the component communication channel can be distinct communication channels, and can be portions of a vehicle network of the vehicle 105, and can be compatible with an API for communication with the data processing system 102 by the network 101.

Figure 2:
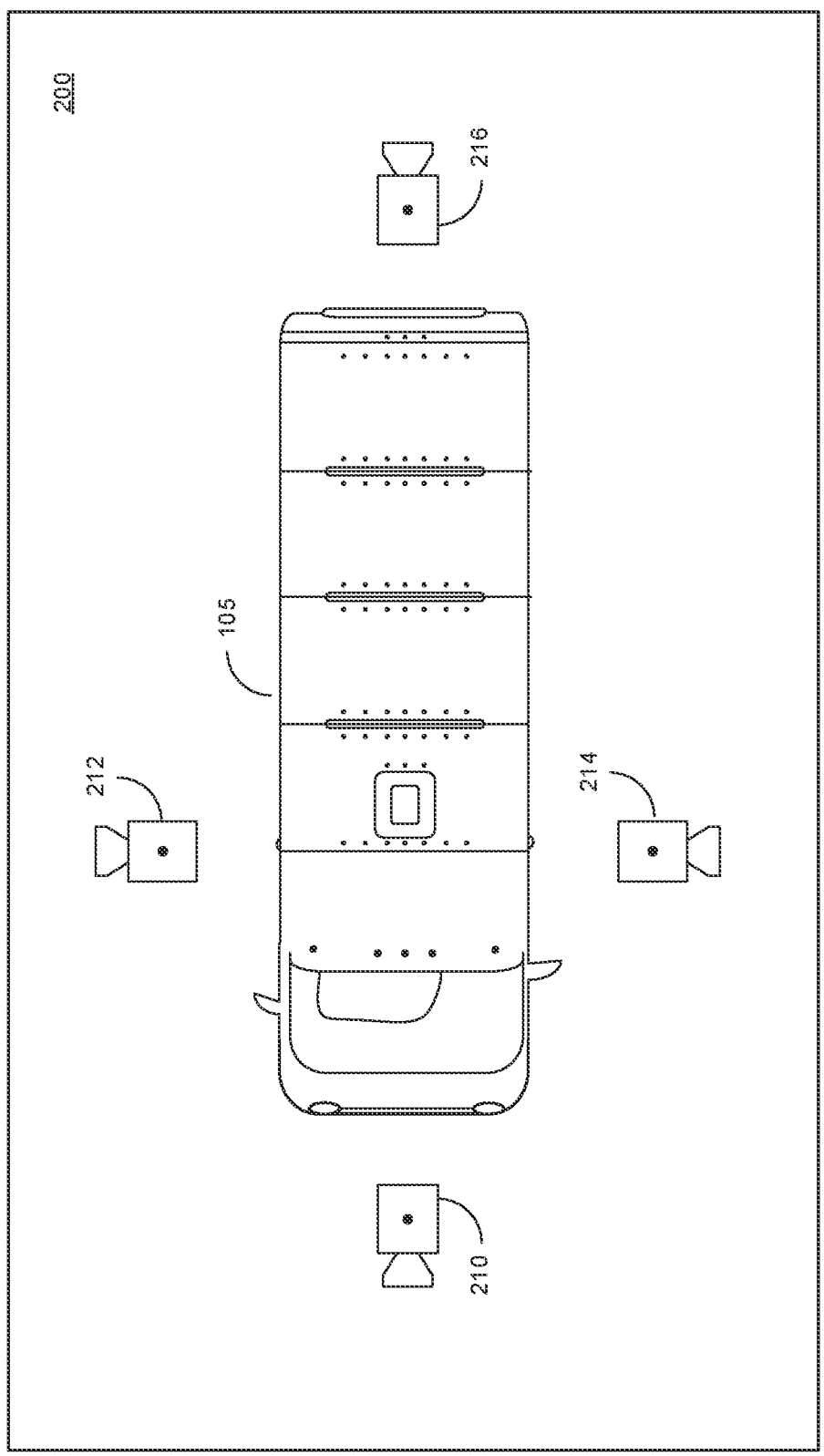
FIG. 2 depicts a vehicle sensor configuration presentation in accordance with present implementations.

As illustrated by way of example in FIG. 2, a vehicle sensor configuration presentation 200 can include a presentation of the vehicle 105, a sensor device 210, a sensor device 212, sensor device 214 and a sensor device 216. The vehicle sensor configuration presentation 200 can be displayed on a graphical user interface, for example. The sensor devices 210, 212, 214 and 216 can be positioned around the presentation of the vehicle 105 correspondingly to a physical orientation of the sensor devices 210, 212, 214 and 216 with respect to the vehicle 105. For example, the sensor device 210 can be oriented to detect stimulus at a front of the vehicle 105, the sensor device 212 can be oriented to detect stimulus at a right side of the vehicle 105, the sensor device 214 can be oriented to detect stimulus at a left side of the vehicle 105, and the sensor device 216 can be oriented to detect stimulus at a front of the vehicle 105.

Figure 3:
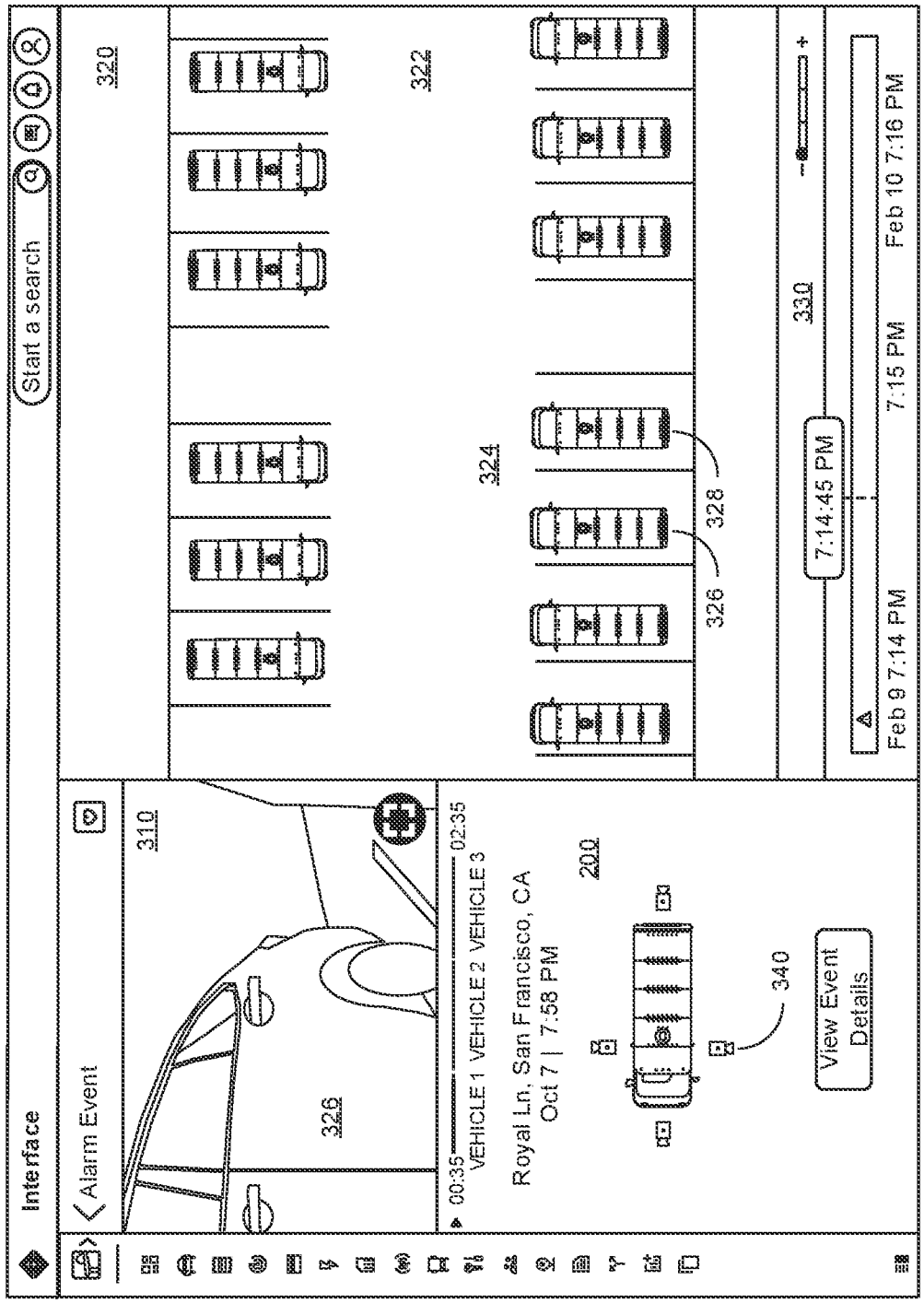
FIG. 3 depicts a user interface in accordance with present implementations.

As illustrated by way of example in FIG. 3, a user interface 300 can include the vehicle sensor configuration presentation 200, a sensor data presentation 310, a yard presentation 320, and a timestamp presentation 330. The sensor data presentation 310 can include an adjacent vehicle 326 detected by a sensing vehicle 328. The sensor data presentation 310 can present, for example, video or audio detected by a selected sensor device 340. For example, the sensor data presentation 310 can show a side of the adjacent vehicle 326 as detected by the sensing vehicle 328.

The yard presentation 320 can include a yard region 322, an activity region 324, the adjacent vehicle 326 and the sensing vehicle 328. The yard region 322 can include a presentation of or representation of a spatial area associated with a sensor detection process. The yard presentation 320 can identify a geolocation or geofenced area within which sensor data from one or more vehicles may be obtained. For example, the yard presentation 320 can be associated with a particular operator, and can represent a yard or parking area within which an operator can store one or more vehicles under control or ownership of the operator, for example. The activity region 324 can be a portion of the yard presentation 320 within which stimulus can be detected, or within which an object or person can be identified. The activity region 324 can be any portion of the yard presentation 320 covered by sensor devices of any vehicle in the yard and associated with the operator, for example. The activity region 324 can be one of a plurality of activity regions, especially where multiple persons, objects or stimuli are detected within the yard presentation 320 concurrently.

The timestamp presentation 330 can include one or more user interface presentations indicating a particular timestamp associated with the sensor data of the sensor data presentation 310, and one or more control affordances to modify the sensor data displayed in the sensor data presentation 310. The timestamp presentation 330 can include a horizontal bar indicating a range of timestamps associated with a particular set of sensor data, and can include a cursor or highlight indicating a timestamps associated with sensor data presented at the sensor data presentation 310.

The vehicle sensor configuration presentation 200 can include the selected sensor device 340. The selected sensor device 340 can correspond to sensor data presented at the sensor data presentation 310. For example, the selected sensor device 340 can correspond to a sensor device at a left side of the sensing vehicle 328. Visual sensor data, in the form of video data, associated with the selected sensor device 340 can be presented at the sensor data presentation 310. The vehicle sensor configuration presentation 200 can include a timestamp portion corresponding to the cursor or highlight of the timestamp presentation 330. The vehicle sensor configuration presentation 200 can include a sensor device identifier indicating a sensor among a plurality of sensors from which sensor data is presented or can be presented.

Figure 4:
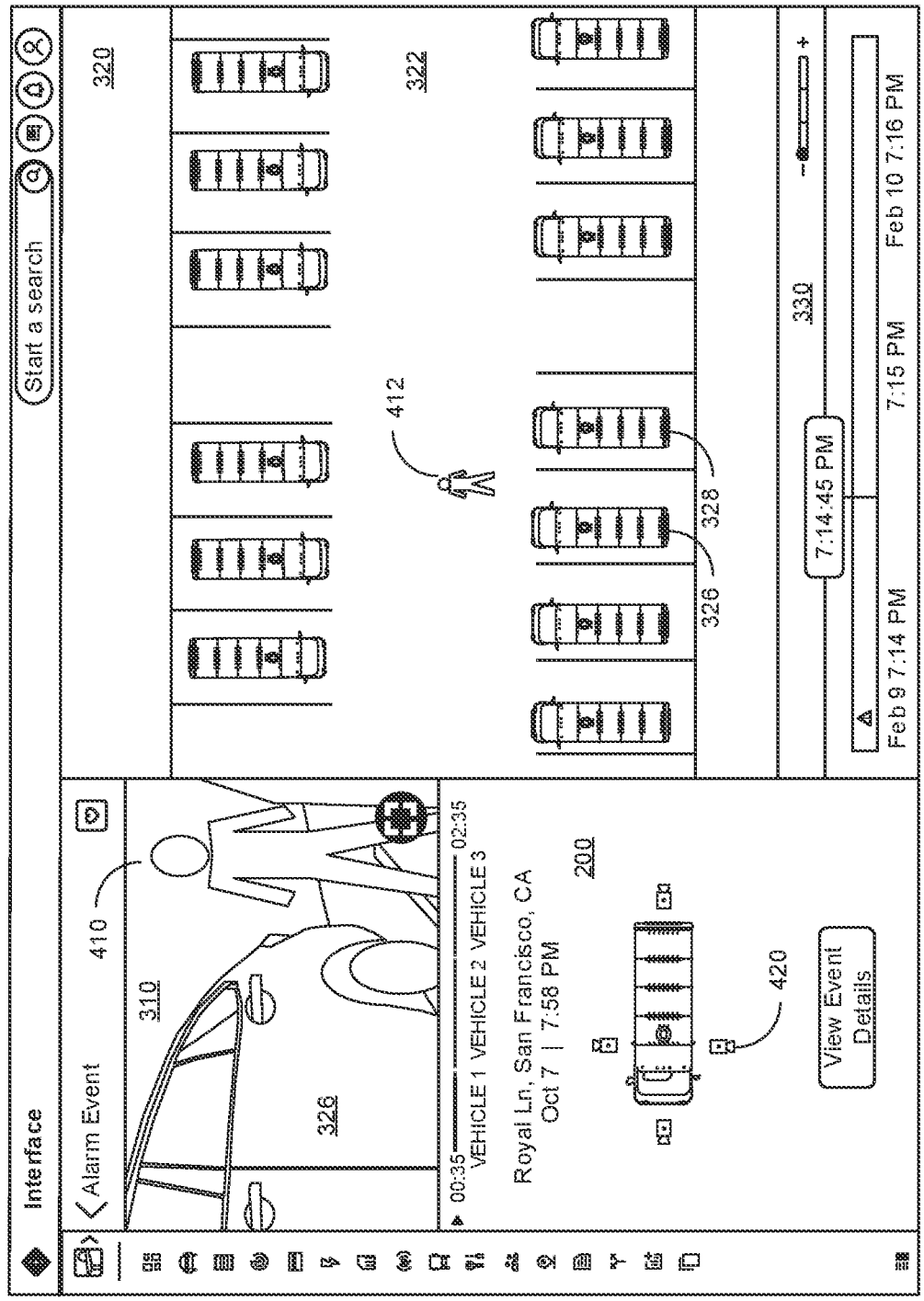
FIG. 4 depicts a user interface in accordance with present implementations.

As illustrated by way of example in FIG. 4, a user interface 400 can include vehicle sensor configuration presentation 200 sensor data presentation 310 yard presentation 320, and timestamp presentation 330. The vehicle sensor configuration presentation 200 can indicate a sensor device of the sensing vehicle 328 that has detected stimulus associated with a particular set of sensor data. The vehicle sensor configuration presentation 200 can include identified sensor 420. The identified sensor 420 can have a presentation modified to illustrate the identified sensor 420 as a source of sensor data being presented. The identified sensor 420 can have a modified color, outline, or any combination thereof, for example, as compared to selected sensor device 340.

The sensor data presentation 310 can present sensor data obtained from the selected sensor device 340. The sensor data presentation 310 can include the adjacent vehicle 326 and a physical object 410. The physical object 410 can include, for example a person standing proximate to and within the sensing vicinity of the sensing vehicle 328 and the adjacent vehicle 326. Proximate location can include a location within the sensing distance limit of a sensor, and within the vicinity of the vehicle can include within a distance from which an object may contact the vehicle.

The yard presentation 320 can present one or more user interface objects derived from the sensor data obtained from the sensing vehicle 328. The yard presentation 320 can include the yard region 322, the adjacent vehicle 326, the sensing vehicle 328 and an object presentation 412. The object presentation 412 can include a representation of a person, where the system or the vehicle determines that the stimulus at the identified sensor 420 corresponds to a person physically located within the yard region 322. The object presentation 412 can include an image, glyph, text object, animation, or any combination, thereof, for example.

Figure 5:
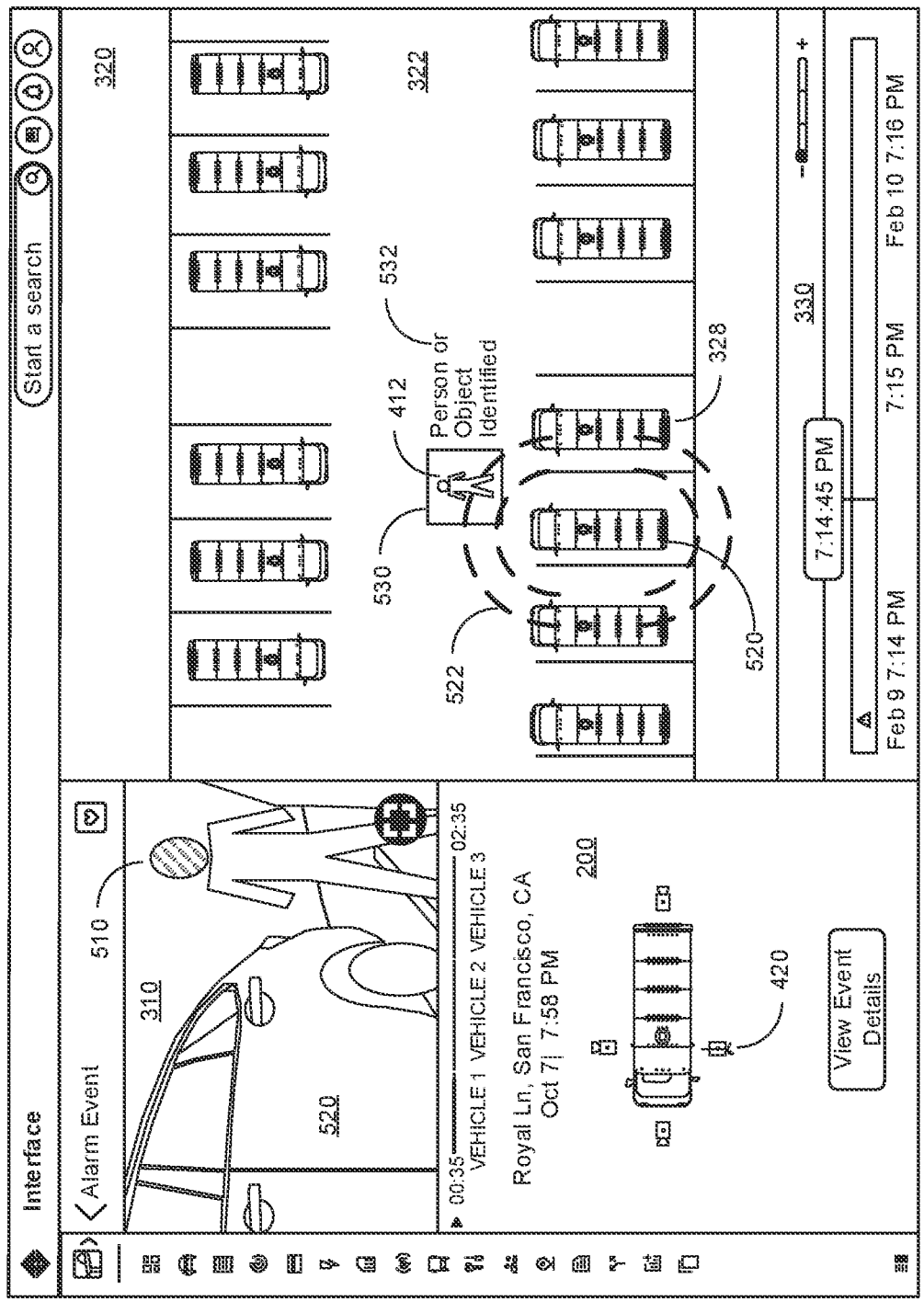
FIG. 5 depicts a user interface in accordance with present implementations.

As illustrated by way of example in FIG. 5, a user interface 500 can include the vehicle sensor configuration presentation 200, the sensor data presentation 310, the yard presentation 320, the yard region 322, and the timestamp presentation 330. Sensor data presentation 310 can present sensor data with annotations. Sensor data presentation 310 can include annotated physical object 510 and an adjacent vehicle in an activated state 520. The annotated physical object 510 can include one or more user interface elements identifying, enhancing, or highlighting a particular feature within the sensor data. For example, the annotated physical object 510 can provide a box, or color highlight on or around a face of person as identified within the sensor data.

The yard region 322 can include one or more user interface objects relevant to detected stimulus or indentation in the yard region 322, and actions by one or more vehicles in the yard region 322. The yard region 322 can include the sensing vehicle 328, the object presentation 412, the adjacent vehicle in an activated state 520, a vehicle activation indication 522 an object identification presentation 530, and an object identification annotation 532. The adjacent vehicle 520 in an activated state 520 can correspond to the adjacent vehicle 326 having a component activated or deactivated in response to the stimulus or the identification. For example, the adjacent vehicle 520 in an activated state 520 can flash its headlights or sound its horn. The object identification presentation 530 can modify or supplement the object presentation 412. For example, the object identification presentation 530 can include a border having a particular color or thickness at least partially surrounding the object presentation 412. The object identification annotation 532 can be located proximate to the object identification presentation 530 or the object presentation 412, and can specify one or more aspects of the object presentation 412. For example, the object identification annotation 532 can include text, glyphs, icons, or any combination thereof to indicate and distinguish between identification of an object, a person, a face, a particular person, a particular object, or a particular face, or any combination thereof.

Figure 6:
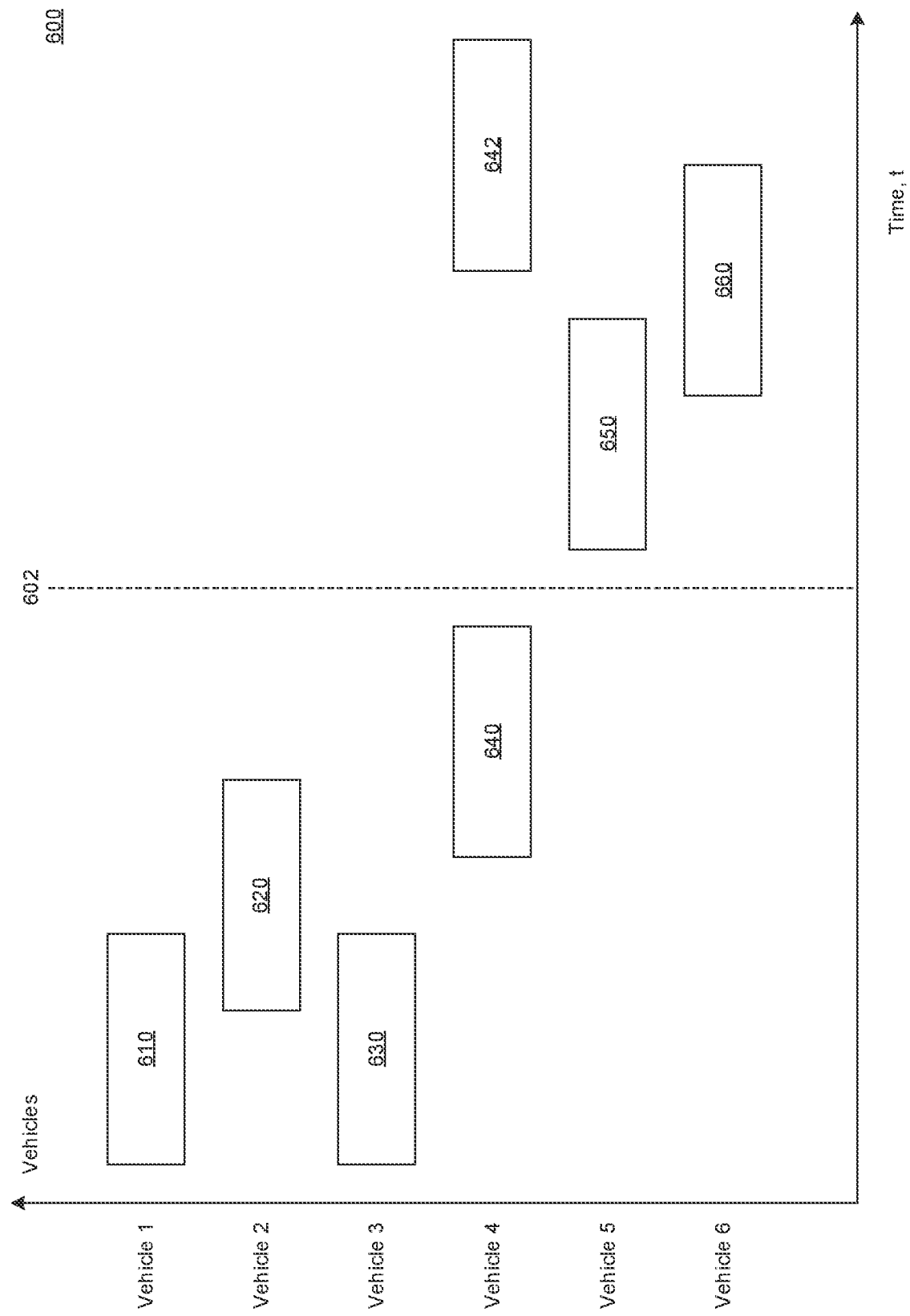
FIG. 6 depicts a sensor data structure in accordance with present implementations.

As illustrated by way of example in FIG. 6, a sensor data structure 600 can include timestamp 602, sensor data obtained from a first vehicle 610, sensor data obtained from a second vehicle 620, sensor data obtained from a third vehicle 630, first sensor data obtained from a fourth vehicle 640, second sensor data obtained from the fourth vehicle 642, sensor data obtained from a fifth vehicle 650 and sensor data obtained from a sixth vehicle 660.

Figure 7:
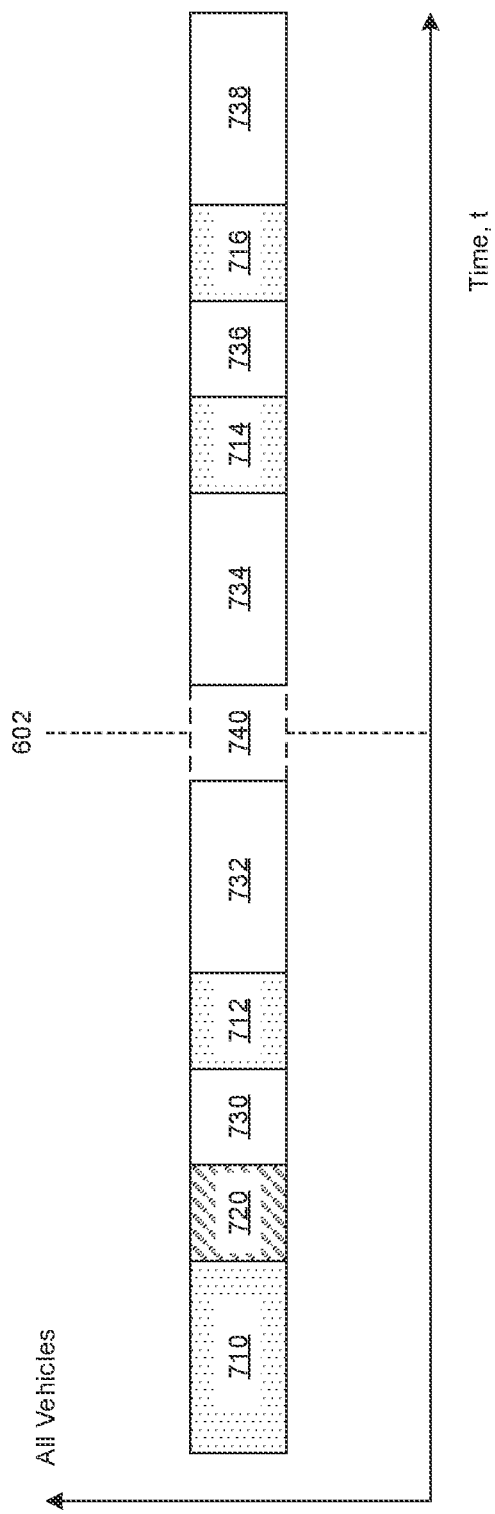
FIG. 7 depicts a sensor data structure in accordance with present implementations.

As illustrated by way of example in FIG. 7, an aggregated sensor data structure 700 is provided. The aggregated sensor data structure 700 can include the timestamp 602, first sensor data aggregated from two vehicles 710, second sensor data aggregated from two vehicles 712, third sensor data aggregated from two vehicles 714, fourth sensor data aggregated from two vehicles 716, sensor data aggregated from three vehicles 720, first sensor data from one vehicle 730, second sensor data from one vehicle 732, third sensor data from one vehicle 734, fourth sensor data from one vehicle 736, fifth sensor data from one vehicle 738, and a sensor data structure portion indicating absence of sensor data 740.

Figure 8:
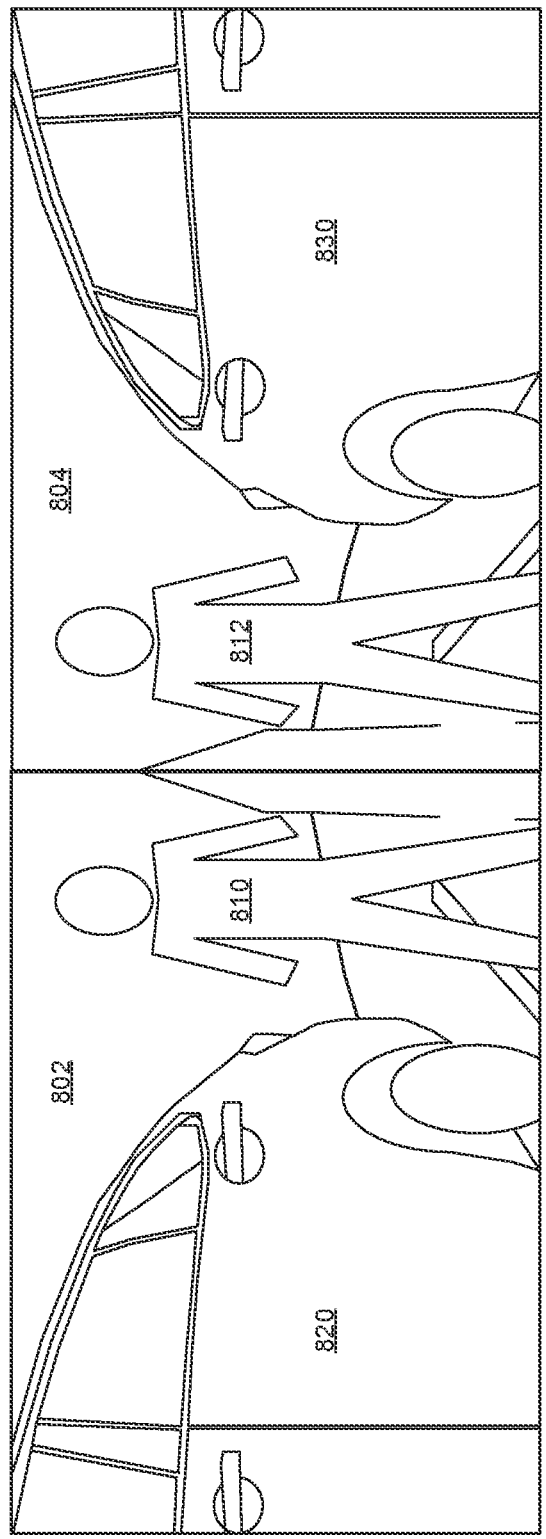
FIG. 8 depicts aggregated sensor data in accordance with present implementations.

As illustrated by way of example in FIG. 8, an aggregated sensor data 800 can include sensor data 802 obtained from a first vehicle 830 and sensor data 804 obtained from a second vehicle 820. Sensor data 802 obtained from a first vehicle 830 can include a physical object 810 detected by first vehicle 830 and second vehicle 820 detected by first vehicle 830. Sensor data 804 obtained from a second vehicle 820 can include a physical object 812 detected by second vehicle 820 and first vehicle 830 detected by second vehicle 820. The sensor data 802 obtained from the first vehicle 830 and the sensor data 804 obtained from the second vehicle 820 can be stitched together into a single video stream, for example, with the timestamps of one or more frames of the sensor data obtained from the first vehicle 830 aligned with the timestamps of one or more frames of the sensor data obtained from the second vehicle 820. The stitched video can be presented based on timestamps, with frames of the video from each of the sensor data 802 and 804 being presented concurrently based on timestamp. The stitched video can be presented at the sensor data presentation 310 as a split-screen presentation including video data from multiple sensors at a particular timestamp, for example.

Figure 9:
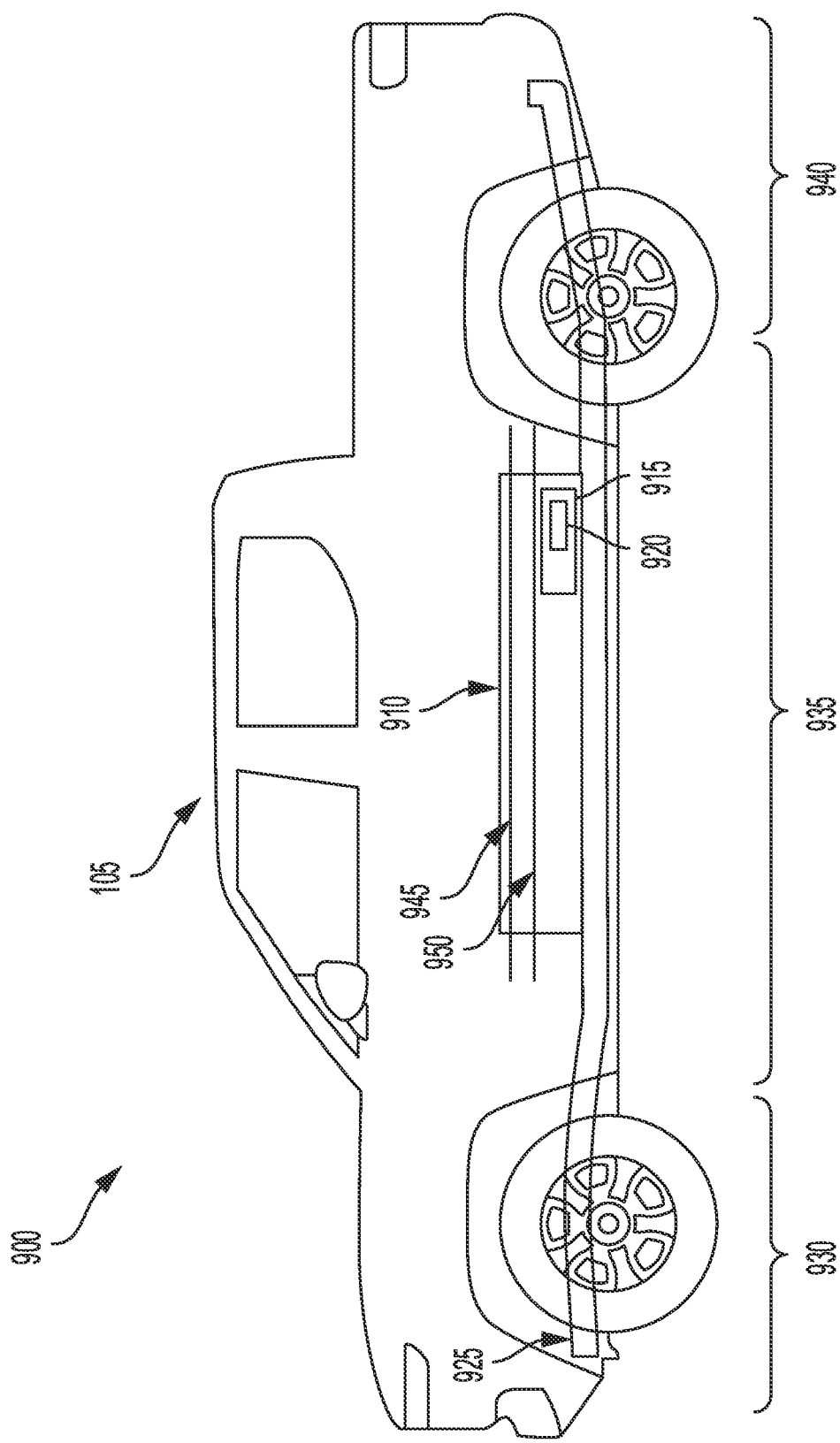
FIG. 9 depicts is an example cross-sectional view of an electric vehicle installed with at least one battery pack.

FIG. 9 depicts is an example cross-sectional view 900 of an electric vehicle 105 installed with at least one battery pack 910. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 910 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 910, battery modules 915, or battery cells 920 to power the electric vehicles. The electric vehicle 105 can include a chassis 925 (e.g., a frame, internal frame, or support structure). The chassis 925 can support various components of the electric vehicle 105. The chassis 925 can span a front portion 930 (e.g., a hood or bonnet portion), a body portion 935, and a rear portion 940 (e.g., a trunk, payload, or boot portion) of the electric vehicle 105. The battery pack 910 can be installed or placed within the electric vehicle 105. For example, the battery pack 910 can be installed on the chassis 925 of the electric vehicle 105 within one or more of the front portion 930, the body portion 935, or the rear portion 940. The battery pack 910 can include or connect with at least one busbar, e.g., a current collector element. For example, the first busbar 945 and the second busbar 950 can include electrically conductive material to connect or otherwise electrically couple the battery modules 915 or the battery cells 920 with other electrical components of the electric vehicle 105 to provide electrical power to various systems or components of the electric vehicle 105.

Figure 10:
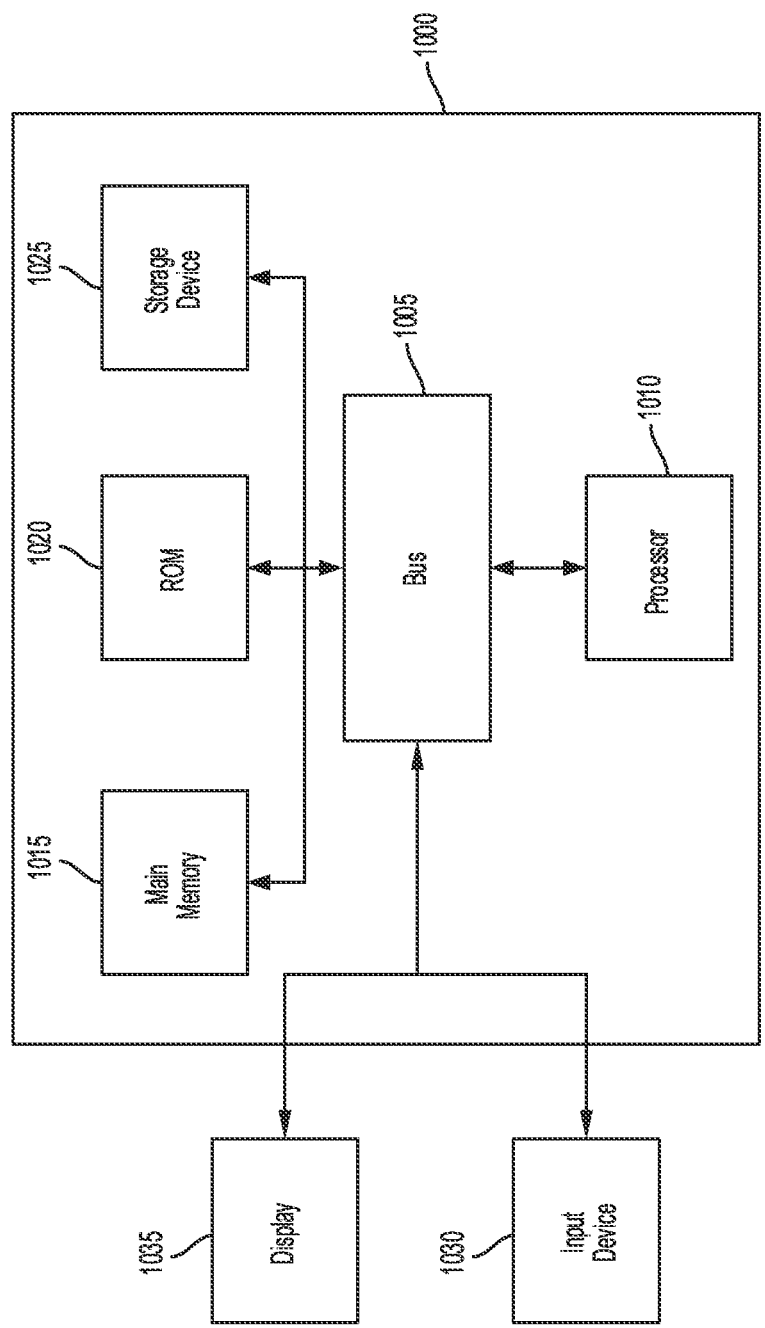
FIG. 10 depicts an example block diagram of an example computer system. The computer system or computing device can include or be used to implement a data processing system or its components.

FIG. 10 depicts an example block diagram of an example computer system 1000. The computer system or computing device 1000 can include or be used to implement a data processing system or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the electric vehicle 105 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Figure 11:
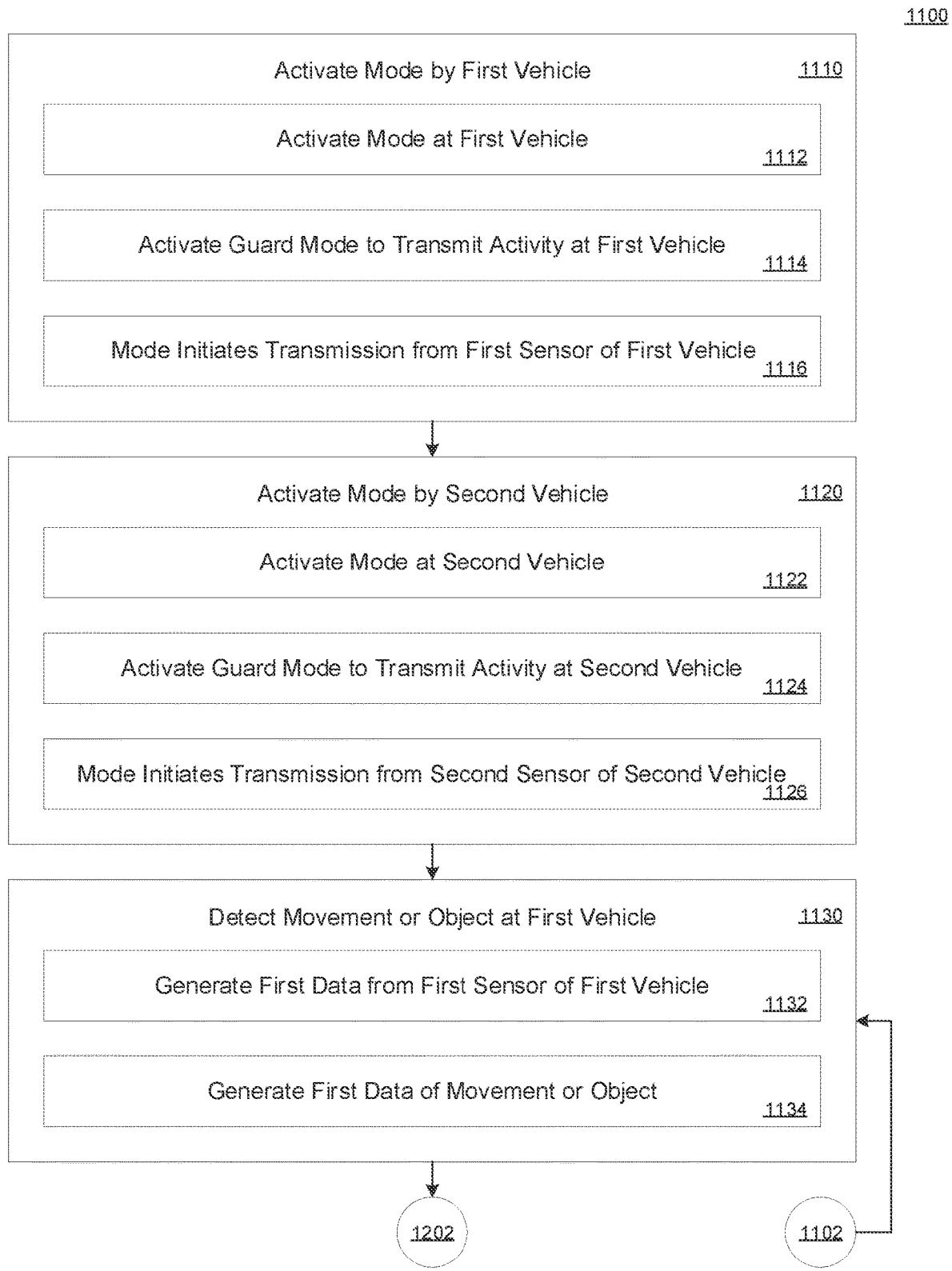
FIG. 11 depicts a method of stitching sensor data from vehicles linked to spatial, temporal, or operator criteria, in accordance with present implementations.

FIG. 11 depicts a method 1100 of stitching sensor data from vehicles linked to spatial, temporal, or operator criteria, in accordance with present implementations. The system 100 can perform method 1100.

The method 1100 can include activating a mode by a first vehicle. (Act 1110.) For example, a vehicle 105 can active a guard mode mode by a vehicle computing system 103 to permit transmission of sensor data from the vehicle 105 to the data processing system 102. Activating a mode by a first vehicle can include activating a mode at a first vehicle. (Act 1112.) For example, a vehicle 105 can active a guard mode at the vehicle computing system 103 to perform guard mode operation at the vehicle 105 at least partially locally at the vehicle 105. Activating a mode by a first vehicle can include activating a guard mode to transmit activity at first vehicle. (Act 1114.) For example, the vehicle 105 can transmit sensor data obtained at the sensor controller 160 to the data processing system 102 by a wireless, cellular, or near-field communication network, or any combination thereof. Activating a mode by a first vehicle can include activating a mode that initiates transmission from a first sensor of a first vehicle. (Act 1116.) For example, a guard mode activated at vehicle 105 can transmit sensor data to the data processing system 102 upon completion of a recording of activity at a particular sensor, or as part of a batch processing upload when connected to the data processing system 102.

For example, subsequent to activating a mode by a first vehicle, the method 1100 can include activating a mode by a second vehicle. (Act 1120.) For example, vehicle 326 can activate a guard mode corresponding to a guard mode activated at vehicle 328 or 105. Activating a mode by a second vehicle can include activating a mode at a second vehicle. (Act 1122.) For example, a vehicle 326 can active a guard mode at the vehicle computing system 103 to perform guard mode operation at the vehicle 326 at least partially locally at the vehicle 326. Activating a mode by a second vehicle can include activating a guard mode to transmit activity at a second vehicle. (Act 1124.) For example, the vehicle 326 can transmit sensor data obtained at the sensor controller 160 to the data processing system 102 by a wireless, cellular, or near-field communication network, or any combination thereof. Activating a mode by a second vehicle can include activating a mode that initiates transmission from a second sensor of a second vehicle. (Act 1126.) For example, a guard mode activated at vehicle 326 can transmit sensor data to the data processing system 102 upon completion of a recording of activity at a particular sensor, or as part of a batch processing upload when connected to the data processing system 102.

Subsequent to activating a mode by a first vehicle, the method 1100 can include detecting movement or presence of an object at a first vehicle. (Act 1130.) For example, vehicle 328 can detect change in an environment corresponding to movement within a frame of a camera sensor of the vehicle 328. Detecting movement or presence of an object at a first vehicle can include generating first data from a first sensor of a first vehicle. (Act 1132.) For example, first data can include input detected from a sensor of a vehicle, or a representation thereof. The first data can include, for example, images, image frames collectively comprising video, audio files, or any combination thereof. Detecting movement or presence of an object at a first vehicle can include generating first data based on the movement or the presence of the object. (Act 1134.) For example, the first data can include or be transmitted with timestamps, locations, or any combination thereof. For example, video data including a plurality of images can include or reference a plurality of timestamps. Each timestamp can reference a particular image within a sequence of images. A location can include coordinates, global positioning system (GPS) coordinates, latitude, longitude, or any combination thereof.

Figure 12:
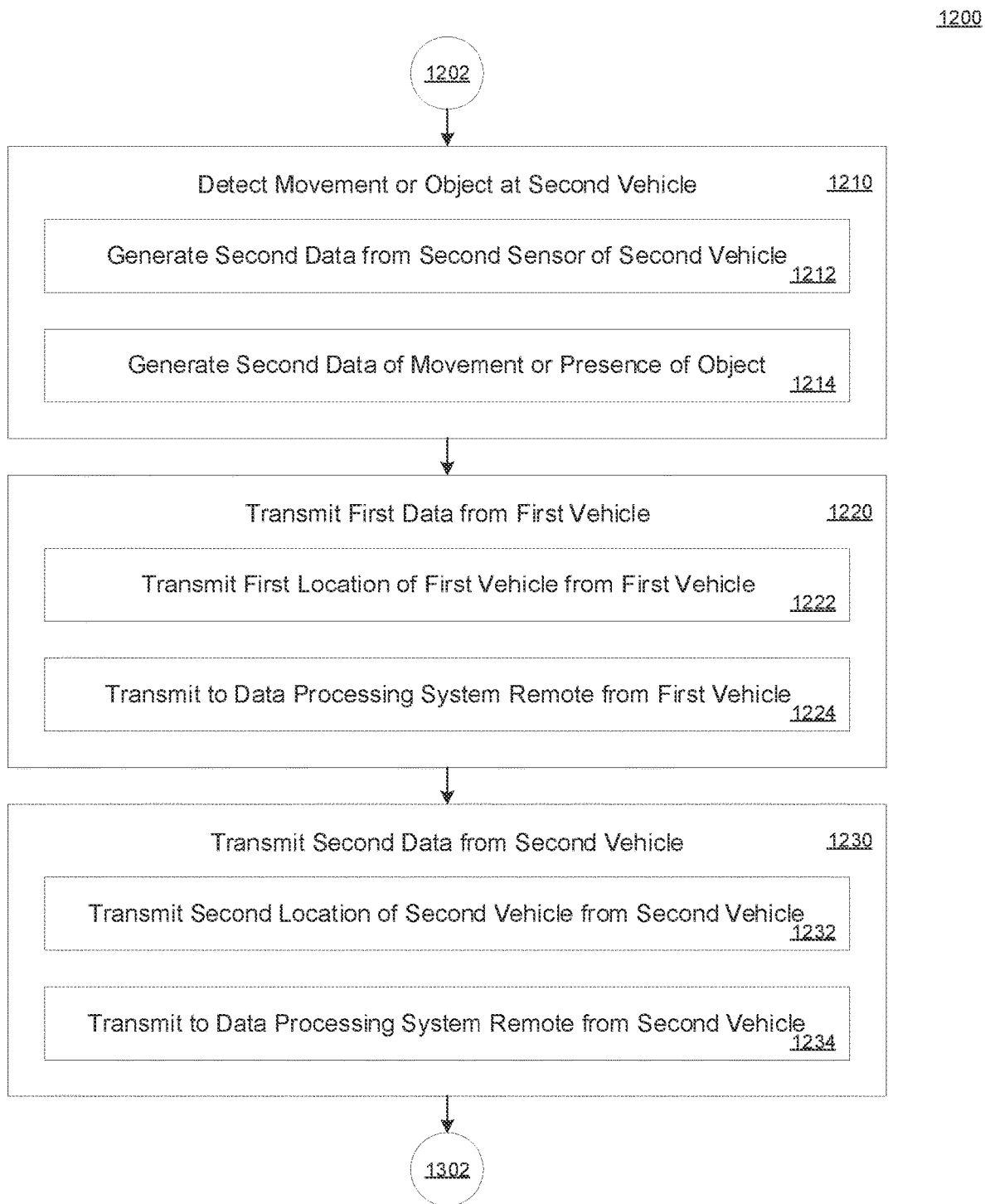
FIG. 12 depicts a method of stitching sensor data from vehicles linked to spatial, temporal, or operator criteria, further to the method of FIG. 11.

FIG. 12 depicts a method of stitching sensor data from vehicles linked to spatial, temporal, or operator criteria, further to the method of FIG. 11. The system 100 can perform method 1200. (Act 1202, Act 1210.)

Subsequent to detecting movement or presence of an object at a first vehicle, the method 1200 can include detecting movement or presence of an object at second vehicle. (Act 1210.) For example, vehicle 326 can detect movement or an object by a camera sensor of the vehicle 326, by the vehicle computing system of the vehicle 326, independently of the vehicle computing system of vehicle 328. Detecting movement or presence of an object at second vehicle can include generating second data from a second sensor of a second vehicle. (Act 1112.) For example, second data can include input detected from a sensor of a vehicle, or a representation thereof. The second data can include, for example, images, image frames collectively comprising video, audio files, or any combination thereof. The second data can have a format or type corresponding to the first data, identical to the first data, or complementary to the first data. For example, first data and second data can both include video data. For example, first data can include video data of an object and second data can include audio data from the object. Detecting movement or presence of an object at second vehicle can include generating second data based on the movement or the presence of the object. (Act 1214.) For example, the second data can correspond at least partially in at least one of structure and operation to the first data.

Subsequent to detecting movement or presence of an object at second vehicle, the method 1200 can include transmitting first data from a first vehicle. (Act. 1220.) For example, the vehicle 328 can transmit the first data by a cellular network linked to the vehicle 328. Transmitting first data from a first vehicle can include transmitting a first location of a first vehicle from the first vehicle. For example, GPS coordinates can be embedded in the first data or transmitted separately from the first data in a distinct data object or packet. Transmitting first data from a first vehicle can include transmitting the first data to a data processing system remote from the first vehicle. (Act 1224.) For example, the first data can be transmitted by the first vehicle 328 located in a vehicle fleet operator site in a first city, to a data processing system 102 located at a fleet management site in a second city.

Subsequent to transmitting first data from a first vehicle, the method 1200 can include transmitting second data from a second vehicle. (Act. 1230.) For example, the vehicle 326 can transmit the second data by a cellular network linked to the vehicle 326. Transmitting second data from a second vehicle can include transmitting a second location of a second vehicle from the second vehicle. (Act 1232.) For example, GPS coordinates can be embedded in the second data or transmitted separately from the second data in a distinct data object or packet. Transmitting second data from a second vehicle can include transmitting the second data to a data processing system remote from the second vehicle. (Act 1234.) For example, the second data can be transmitted by the second vehicle 326 located in a vehicle fleet operator site in a first city, to a data processing system 102 located at a fleet management site in a second city.

Figure 13:
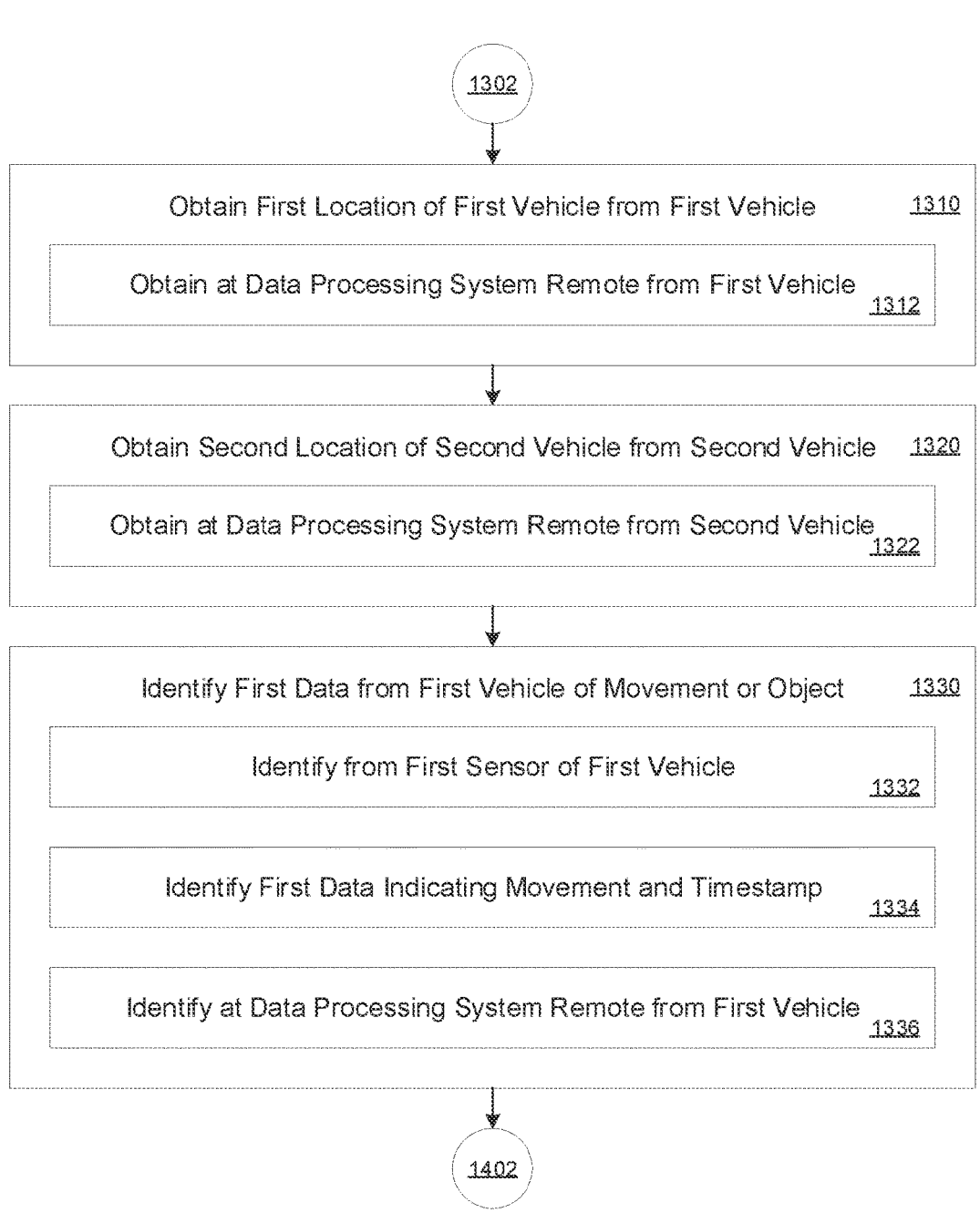
FIG. 13 depicts a method of stitching sensor data from vehicles linked to spatial, temporal, or operator criteria, further to the method of FIG. 12.

FIG. 13 depicts a method of stitching sensor data from vehicles linked to spatial, temporal, or operator criteria, further to the method of FIG. 12. The system 100 can perform method 1300. (Act 1302, Act 1310.)

Subsequent to transmitting the second data to a data processing system remote from the second vehicle, the method 1300 can include obtaining a first location of a first vehicle from the first vehicle. (Act. 1310.) For example, the data processing system 102 can obtain a GPS coordinate from the vehicle 328 or from first data transmitted by the vehicle 328. Obtaining a first location of a first vehicle 328 from the first vehicle 328 can include obtaining a first location of a first vehicle at a data processing system remote from the first vehicle. (Act. 1312.) For example, the first vehicle 328 can transmit the GPS location over an Internet connection as a JSON object.

Subsequent to obtaining a first location of a first vehicle from the first vehicle, the method 1300 can include obtaining a second location of a second vehicle from the second vehicle. (Act 1320.) For example, the data processing system 102 can obtain a GPS coordinate from the vehicle 326 or from first data transmitted by the vehicle 326. Obtaining a second location of a second vehicle from the second vehicle can include obtaining a second location of a second vehicle at a data processing system remote from the second vehicle. (Act 1322.) For example, the first vehicle 328 can transmit the GPS location over an Internet connection as a JSON object.

Subsequent to obtaining a second location of a second vehicle from the second vehicle, the method 1300 can include identifying first data from a first vehicle of movement or presence of an object. (Act. 1330.) For example, the data processing system 102 can identify movement in one or more images of video data, independently of associating the movement with an object. For example, the data processing system 102 can identify an object in one or more images of video data, independently of associating the object with any movement. Identifying first data from a first vehicle of movement or presence of an object can include identifying the first data from a first sensor of a first vehicle. (Act 1332.) For example, the data processing system 102 can identify a particular video data object from a plurality of video data objects obtained from vehicle 328, based on a timestamp corresponding to a time of interest obtained from a user interface of the data processing system 102. Identifying first data from a first vehicle of movement or presence of an object can include identifying first data indicating one or more of movement and timestamp. (Act 1334.) For example, the data processing system can extract a timestamp from first data. For example, the data processing system 102 can identify video data containing movement based on a tag or label created by the data processing system 102 in response to an image recognition process. Identifying first data from a first vehicle of movement or presence of an object can include identifying the first data at a data processing system remote from first vehicle. (Act 1336.) For example, the first data can be transmitted by the first vehicle 328 located in a vehicle fleet operator site in a first city, to a data processing system 102 located at a fleet management site in a second city.

Figure 14:
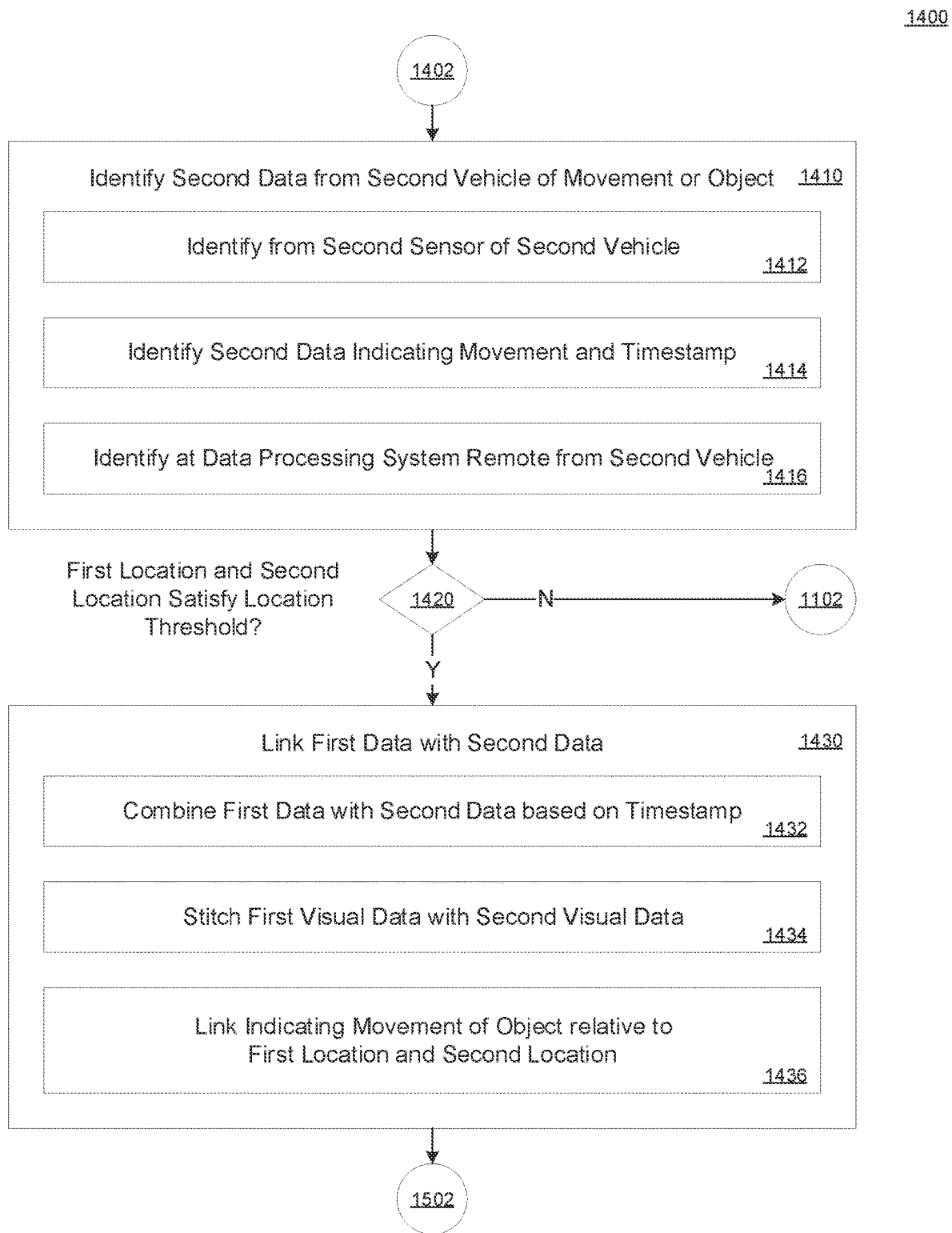
FIG. 14 depicts a method of stitching sensor data from vehicles linked to spatial, temporal, or operator criteria, further to the method of FIG. 13.

FIG. 14 depicts a method of stitching sensor data from vehicles linked to spatial, temporal, or operator criteria, further to the method of FIG. 13. The system 100 can perform method 1400. (Act 1402, Act 1410.)

Subsequent to identifying first data from a first vehicle of movement or presence of an object, the method 1400 can include identifying second data from a second vehicle of movement or presence of an object. (Act 1410.) For example, the data processing system 102 can identify movement in one or more images of video data, independently of associating the movement with an object. For example, the data processing system 102 can identify an object in one or more images of video data, independently of associating the object with any movement. The data processing system 102 can identify second data at least partially based on identified first data, or in coordination with identifying first data. Identifying second data from a second vehicle of movement or presence of an object can include identifying the second data from a second sensor of the second vehicle. (Act 1412.) For example, the data processing system 102 can identify a particular video data object from a plurality of video data objects obtained from vehicle 326, based on a timestamp corresponding to a time of interest obtained from a user interface of the data processing system 102. Identifying second data from a second vehicle of movement or presence of an object can include identifying the second data indicating one or more of movement and timestamp. (Act 1414.) For example, the data processing system can extract a timestamp from second data. For example, the data processing system 102 can identify video data containing movement based on a tag or label created by the data processing system 102 in response to an image recognition process, in coordination with a corresponding process to perform the corresponding operation on first data. Identifying second data from a second vehicle of movement or presence of an object can include identifying the second data at a data processing system remote from the second vehicle. (Act 1416.) For example, the second data can be transmitted by the first vehicle 326 located in a vehicle fleet operator site in a first city, to a data processing system 102 located at a fleet management site in a second city.

Subsequent to identifying the second data from a second vehicle of movement or presence of an object, the method 1400 can include determining whether a first location and a second location satisfy a location threshold. (Act. 1420.) For example, the data processing system 102 can determine that the first location and the second location are greater than a mile or kilometer apart, indicating that the first location and the second location correspond to different fleet operator sites. In accordance with a determination that a first location and a second location satisfy a location threshold, the method 1400 can include continuing to link first data with second data. (Act. 1430.) In accordance with a determination that a first location and a second location do not satisfy a location threshold, the method 1400 can include detecting movement or presence of an object at a first vehicle. (Act 1102, Act 1130.) A location threshold can correspond to a maximum or minimum distance between the first location and the second location, or any distance operation or transformation taking the first location and the second location as input.

Subsequent to determining that the first location and the second location satisfy the location threshold, the method 1400 can include linking first data with second data. (Act 1430.) For example, the data processing system 102 can combine image frames of video data into a combined video stream having side-by-side or picture-in-picture views presenting concurrently video data from multiple cameras of one or more vehicles 326 and 328. Linking first data with second data can include combining first data with second data based on a timestamp. (Act 1432.) For example, the data processing system 102 can combine image frames of video data having matching or corresponding times tamps associated with a particular time of interest. Linking first data with second data can include stitching together first visual data with second visual data. (Act 1434.) For example, the data processing system 102 can combine video data from multiple video data sources into a single video data encompassing a time range greater than any individual video data input. Linking first data with second data can include linking first data with second data to indicate movement of an object relative to one or more of a first location and a second location. (Act 1436.) For example, the data processing system 102 can identify a particular object or particular movement within a subset of available video data files, and can combine the subset of video data files to generate video directed to the particular identified movement or particular identified object.

Figure 15:
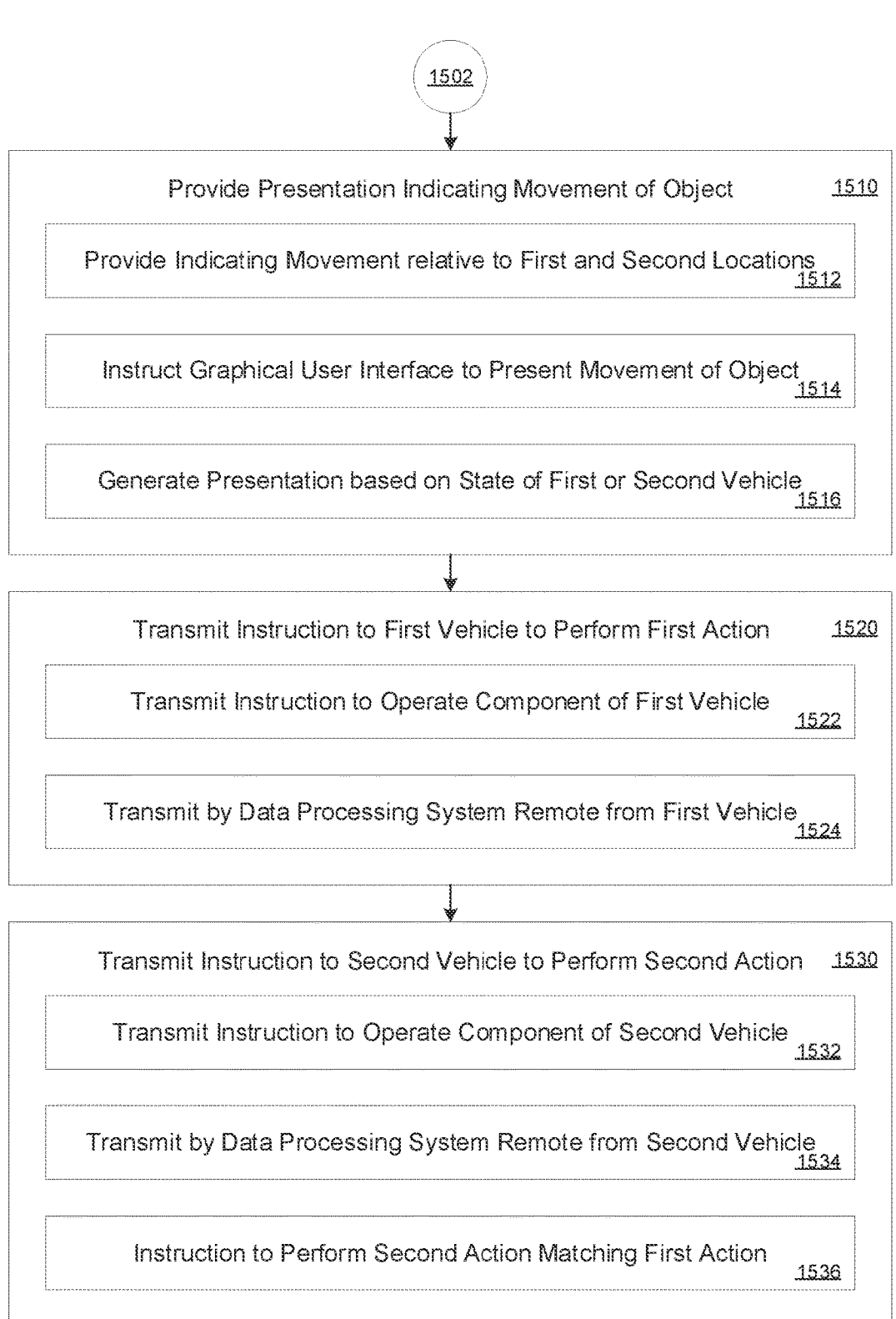
FIG. 15 depicts a method of stitching sensor data from vehicles linked to spatial, temporal, or operator criteria, further to the method of FIG. 14.

FIG. 15 depicts a method of stitching sensor data from vehicles linked to spatial, temporal, or operator criteria, further to the method of FIG. 14. The system 100 can perform method 1500. (Act 1502, Act 1510.)

Subsequent to linking first data with second data, the method 1500 can include providing a presentation indicating movement or presence of an object. (Act 1510.) For example, the data processing system 102 can instruct a user interface 310 to present data 800 including 802 and 804. The method 1500 can include performing one or more of object recognition and image interpretation to determine whether objects detected by multiple sensors of one or more vehicles is a same object. Providing a presentation indicating movement or presence of an object can include providing a presentation indicating movement relative to one or more of first and second locations. (Act 1512.) For example, the data processing system 102 can include detecting that an object is the same object from one video stream to the other stream. The method 1500 can include making this determination before stitching together various data files. For example, the method 1500 can include performing face detection on an object to determine whether it includes a face. The method 1500 can include performing face identification to determine whether the face appearing in multiple sensors correspond to the same face at a particular threshold indicating confidence in the facial match. Providing a presentation indicating movement or presence of an object can include instructing a graphical user interface to present a representation of movement of an object. (Act 1514.) For example, annotation 510 can indicate or highlight a rapid or erratic movement identified by the data processing system 102. Providing a presentation indicating movement or presence of an object can include generating a presentation based on a state of one or more of a first or a second vehicle. (Act 1516.) For example, the data processing system 102 can generate a presentation based only on vehicles in a guard mode, and can ignore or be blocked from generating a presentation based on data from or state of any vehicle with guard mode deactivated.

Subsequent to generating a presentation, providing a presentation indicating movement or presence of an object, the method 1500 can include transmitting an instruction to a first vehicle to perform a first action. (Act 1520.) For example, the data processing system 102 can transmit an instruction over a cellular network to operate a particular device integrated with the vehicle 328. Transmitting an instruction to a first vehicle to perform a first action can include transmitting an instruction to operate a component of a first vehicle. (Act 1522.) For example, the data processing system 102 can instruct the vehicle 328 to activate its horn. Transmitting an instruction to a first vehicle to perform a first action can include transmitting an instruction by a data processing system remote from first vehicle. (Act 1524.) For example, the data processing system 102 can send an instruction from a first city to the vehicle 328 located in a second city, by a wireless network.

Subsequent to transmitting an instruction to a first vehicle to perform a first action, the method 1500 can include transmitting an instruction to second vehicle to perform a second action. (Act 1530.) For example, the data processing system 102 can transmit an instruction over a cellular network to operate a particular device integrated with the vehicle 326, based on or complementary to an instruction to the vehicle 328. Transmitting an instruction to second vehicle to perform a second action can include transmitting an instruction to operate a component of second vehicle. (Act 1532.) For example, the data processing system 102 can instruct the vehicle 326 to activate its horn to match an instruction sent to the vehicle 328 to activate its horn. Transmitting an instruction to second vehicle to perform a second action can include transmitting an instruction by a data processing system remote from the second vehicle. (Act 1534.) For example, the data processing system 102 can send an instruction from a first city to the vehicle 326 located in a second city, by a wireless network. Transmitting an instruction to the second vehicle to perform a second action can include transmitting an instruction to perform a second action at the second vehicle matching or corresponding to a first action at the first vehicle. (Act 1530.) For example, a second vehicle can lock its doors concurrently with a first vehicle locking its doors. For example, a second vehicle can lock its doors concurrently with a first vehicle flashing its interior or exterior lights.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a data processing system comprising one or more processors, coupled to memory, to:
        enter, in response to an instruction received locally at a first vehicle, a first mode to transmit sensor data from the first vehicle from a second mode which inhibits the transmission of the sensor data;
        identify, from a first sensor of the first vehicle in response to an activation by the first vehicle of the first mode, first data indicative of movement of an object and a timestamp;
        identify, based on the timestamp and from a second sensor of a second vehicle in response to an activation by the second vehicle of the first mode that initiates transmission from the second sensor, second data indicative of the movement of the object;
        link, in response to a determination that a location of the first vehicle and a location of the second vehicle are within a predefined geographic area, the first data with the second data to indicate, via a graphical user interface, the movement of the object relative to the location of the first vehicle and the location of the second vehicle; and
        provide, for presentation via the graphical user interface, a map depicting a path of the movement of the object in a volume containing the vehicles relative to the location of the first vehicle and the location of the second vehicle.

2. The system of claim 1, comprising the data processing system to:
obtain, from the first vehicle in response to detection by the first sensor of the first vehicle of the movement of the object, the first data; and
obtain, from the second vehicle in response to detection by the second sensor of the second vehicle of the movement of the object, the second data.

3. The system of claim 1, comprising the data processing system to:
obtain, from the first vehicle or based on the first data, third data corresponding to the location of the first vehicle; and
obtain, from the second vehicle or based on the second data, fourth data corresponding to the location of the second vehicle.

4. The system of claim 1, comprising the data processing system to:
instruct, in response to the determination that the location of the first vehicle is within the predefined geographic area, the first vehicle to perform a first action local to the first vehicle.

5. The system of claim 1, comprising the data processing system to:
instruct, in response to the determination that the location of the second vehicle is within the predefined geographic area and that a charge level of the second vehicle exceeds a charge level threshold, the second vehicle to perform a second action local to the second vehicle corresponding to a first action local to the first vehicle.

6. The system of claim 1, comprising the data processing system to:
generate, in response to a determination that a power state of the first vehicle satisfies a power threshold, the presentation.

7. The system of claim 6, comprising the data processing system to:
generate, in response to a determination a power state of the second vehicle satisfies the power threshold, the presentation.

8. The system of claim 1, comprising the data processing system to:
identify, in response to a determination that the first vehicle and the second vehicle each correspond to a first operator, the first data and the second data.

9. A vehicle, comprising:
a sensor, a non-transitory memory, and one or more processors to:
activate a mode that initiates transmission from the sensor from a mode which inhibits the transmission;
detect, by the sensor, movement of an object relative to the vehicle;
transmit, in response to the activating, a timestamp and first data indicative of the movement of the object and a timestamp;
receive an instruction based on the timestamp and an identification of the first data and an identification of second data indicative of the movement of the object and detected by a second sensor of a second vehicle activated by the second vehicle in a mode that initiates transmission from the second sensor, and generated in response a determination that a location of the vehicle and a location of the second vehicle are each within a predefined geographic area; and
perform, in response to the determination that the location of the vehicle satisfies a location threshold corresponding to a location of a second vehicle, a first action local to the first vehicle.

10. The vehicle of claim 9, wherein the first action corresponds to a second action by the second vehicle, performed local to the second vehicle.

11. The vehicle of claim 9, comprising the processors to:
cause, in response to the transmission, a user interface to present an indication of the movement of the object relative to the location of the vehicle and the location of the second vehicle.

12. The vehicle of claim 9, comprising:
the location of the vehicle corresponding to third data transmitted by the vehicle or based on the first data.

13. The vehicle of claim 9, comprising:
the location of the second vehicle corresponding to fourth data transmitted by the second vehicle or based on the second data.

14. The vehicle of claim 9, comprising the processors to:
transmit a power state of the first vehicle, the action performed based on a determination that the power state satisfies a power threshold.

15. A method, comprising:
entering, by a first vehicle, a first mode to transmit sensor data from a second mode which inhibits the transmission of the sensor data in response to an instruction received locally at a first vehicle;
identifying, from a first sensor of a first vehicle, first data indicating movement of an object and a timestamp;
identifying, based on the timestamp and from a second sensor of a second vehicle in response to an activation by the first vehicle of the first mode that initiates transmission from the first sensor, second data indicating the movement of the object;
linking, in response to a determination that a location of the first vehicle and a location of the second vehicle are each within a predefined geographic area, the first data and the second data to indicate, via a graphical user interface, the movement of the object relative to the location of the first vehicle and the location of the second vehicle; and
providing, for presentation via the graphical user interface, a map depicting a path of the movement of the object in a volume containing the vehicles relative to the location of the first vehicle and the location of the second vehicle.

16. The method of claim 15, comprising:
obtaining, from the first vehicle in response to detecting by the first sensor of the first vehicle of the movement of the object, the first data; and
obtaining, from the second vehicle in response to detecting by the second sensor of the second vehicle of the movement of the object, the second data.

17. The method of claim 15, comprising:
obtaining, from the first vehicle or based on the first data, third data corresponding to the location of the first vehicle; and
obtaining, from the second vehicle or based on the second data, fourth data corresponding to the location of the second vehicle.

18. The method of claim 15, comprising:
instructing, in response to the determination that the location of the first vehicle and the location of the second vehicle are within the predefined geographic area, the first vehicle to perform a first action local to the first vehicle and the second vehicle to perform a second action local to the second vehicle, corresponding to the first action.

19. The method of claim 15, comprising:
generating, in response a determination that a power state of the first vehicle and a power state of the second vehicle each satisfy a power threshold, the presentation.

20. The method of claim 15, comprising:
identifying, in response a determination that the first vehicle and the second vehicle each correspond to a first operator, the first data and the second data.

\* \* \* \* \*